United States Patent
Shiraishi et al.

(10) Patent No.: US 12,203,786 B2
(45) Date of Patent: Jan. 21, 2025

(54) ENCODER

(71) Applicant: Panasonic Intellectual Property Management Co., Ltd., Osaka (JP)

(72) Inventors: Masaru Shiraishi, Osaka (JP); Shuichi Nagai, Osaka (JP); Junya Aso, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 18/554,950

(22) PCT Filed: Apr. 12, 2022

(86) PCT No.: PCT/JP2022/017644
§ 371 (c)(1),
(2) Date: Oct. 11, 2023

(87) PCT Pub. No.: WO2022/230665
PCT Pub. Date: Nov. 3, 2022

(65) Prior Publication Data
US 2024/0200988 A1   Jun. 20, 2024

(30) Foreign Application Priority Data
Apr. 28, 2021 (JP) ................................. 2021-076593

(51) Int. Cl.
*G01D 5/34* (2006.01)
*G01D 5/347* (2006.01)

(52) U.S. Cl.
CPC .................. *G01D 5/3473* (2013.01)

(58) Field of Classification Search
CPC .. G01D 5/347; G01D 5/34707; G01D 5/3473; G01D 5/34746; G01D 5/34776
See application file for complete search history.

(56) References Cited

U.S. PATENT DOCUMENTS

| 6,232,593 | B1* | 5/2001 | Taniguchi | G01D 5/347 341/13 |
|---|---|---|---|---|
| 2002/0020809 | A1 | 2/2002 | Taniguchi et al. | |
| 2013/0258352 | A1 | 10/2013 | Fukuhara | |
| 2014/0132124 | A1* | 5/2014 | Yoshida | G01D 5/3473 310/68 B |
| 2019/0376817 | A1 | 12/2019 | Fukuda et al. | |

FOREIGN PATENT DOCUMENTS

| JP | 63-078021 A | 4/1988 |
|---|---|---|
| JP | 08-233608 A | 9/1996 |

(Continued)

OTHER PUBLICATIONS

International Search Report issued on Jun. 28, 2022 in International Patent Application No. PCT/JP2022/017644, with English translation.

*Primary Examiner* — Kevin K Pyo
(74) *Attorney, Agent, or Firm* — Rimon P.C.

(57) ABSTRACT

An encoder includes: a rotating plate; an irradiator that irradiates the rotating plate with light; and a light receiver that receives the light which has been emitted from the irradiator and traveled via the rotating plate. The rotating plate includes at least one curved surface, and the irradiator simultaneously irradiates each of a plurality of surfaces including the curved surface with light.

24 Claims, 18 Drawing Sheets

(56) References Cited

FOREIGN PATENT DOCUMENTS

| | | |
|---|---|---|
| JP | 10-239108 A | 9/1998 |
| JP | 2003-114140 A | 4/2003 |
| JP | 2007-183116 A | 7/2007 |
| JP | 2013-195180 A | 9/2013 |
| JP | 2019-211361 A | 12/2019 |

* cited by examiner (a)

(b)

[Normal]

(a)

[Eccentricity/Surface blurring]

(b)

[Normal]

(a)

[Eccentricity/Surface blurring]

(b)

[Eccentricity]

[Surface blurring]

ENCODER

CROSS-REFERENCE OF RELATED APPLICATIONS

This application is the U.S. National Phase under 35 U.S.C. § 371 of International Patent Application No. PCT/JP2022/017644, filed on Apr. 12, 2022, which in turn claims the benefit of Japanese Patent Application No. 2021-076593, filed on Apr. 28, 2021, the entire disclosures of which Applications are incorporated by reference herein.

TECHNICAL FIELD

The present disclosure relates to an encoder, and in particular to an optical encoder.

BACKGROUND ART

In servo motors incorporated in machine tools, robots, or the like, encoders are used to detect the angles of rotation of the servo motors. The encoders include a rotary encoder that detects rotational displacement in the angle of rotation or the like and a linear encoder that detects linear displacement. Further, a light-transmission-type optical encoder and a light-reflection-type optical encoder are known as the encoders.

The transmission-type rotary encoder includes a rotating plate provided with a plurality of light-transmissive portions and a plurality of non-light-transmissive portions in a predetermined pattern as a code pattern for detecting rotational displacement, and a substrate provided with a light-receiving element In the transmission-type rotary encoder, the angle of rotation is detected by irradiating the code pattern of the rotating plate with light and receiving the light transmitted through the transmissive portion with the light-receiving element.

On the other hand, the light-reflection-type rotary encoder includes a rotating plate provided with a plurality of light-reflective portions and a plurality of non-light-reflective portions in a predetermined pattern as a code pattern for detecting rotational displacement, and a substrate provided with a light-receiving element. In the light-reflection-type rotary encoder, the angle of rotation is detected by irradiating the code pattern of the rotating plate with light and receiving the light reflected by the light-reflective portion with the light-receiving element.

Conventionally, there is known a light-reflection-type encoder including a rotating plate provided with an absolute pattern (M-code or the like), which is a pattern for detecting an absolute angular position, and an incremental pattern, which is a pattern for detecting a relative angular position, as a code pattern for detecting rotational displacement (for example, Patent Literature (PTL) 1).

CITATION LIST

Patent Literature

[PTL 1] Japanese Unexamined Patent Publication No. 2019-211361

SUMMARY OF INVENTION

Technical Problem

In the optical encoder, as illustrated in FIG. 24, the center of fixed portion 3 (substrate), which is provided with a light-receiving element, and the center of rotating plate 2 may be misaligned to cause eccentricity, or as illustrated in FIG. 25, rotating plate 2 may tilt to cause surface blurring, whereby a spot of light received by the light-receiving element may be displaced from a predetermined position. That is, when eccentricity or surface blurring occurs, a part of an irradiation spot of light received by the light-receiving element may extend beyond a predetermined range of the light-receiving region of the light-receiving element. As a result, the part extending beyond the predetermined range of the light-receiving region leads to a reduction in amount of light, thus decreasing the signal intensity of the light received by the light-receiving element and inducing erroneous detection.

Particularly in recent years, there has been a consideration to increase the precision of a code pattern for detecting rotational displacement in an encoder in response to the demand for higher position resolution. However, simply increasing the precision of the code pattern may reduce the amount of light received per unit light-receiving element and further induce erroneous detection associated with eccentricity or surface blurring. For example, when absolute and incremental patterns provided as a code pattern are increased in precision from 9 bits to 10 bits, erroneous detection associated with eccentricity or surface blurring occurs frequently.

As described above, in the conventional encoder, it has been difficult to simply increase the precision of the code pattern and perform position detection, and there have been limitations in performing position detection with high accuracy.

The present disclosure has been made to solve such a problem, and it is an object of the present disclosure to provide an encoder capable of realizing high accuracy in position detection.

Solution to Problem

In order to achieve the above object, an aspect of a first encoder according to the present disclosure includes: a rotating plate; an irradiator that irradiates the rotating plate with light; and a light receiver that receives the light which has been emitted from the irradiator and traveled via the rotating plate. The rotating plate includes at least one curved surface, and the irradiator simultaneously irradiates each of a plurality of surfaces including the at least one curved surface with light.

Further, an aspect of a second encoder according to the present disclosure includes: a substrate that moves linearly; an irradiator that irradiates the substrate with light; and a light receiver that receives the light which has been emitted from the irradiator and traveled via the substrate. The substrate includes at least one curved surface, and the irradiator simultaneously irradiates each of a plurality of surfaces including the at least one curved surface with light.

Advantageous Effects of Invention

According to the encoder of the present disclosure, it is possible to perform position detection with high accuracy.

DESCRIPTION OF EMBODIMENTS

Figure 1:
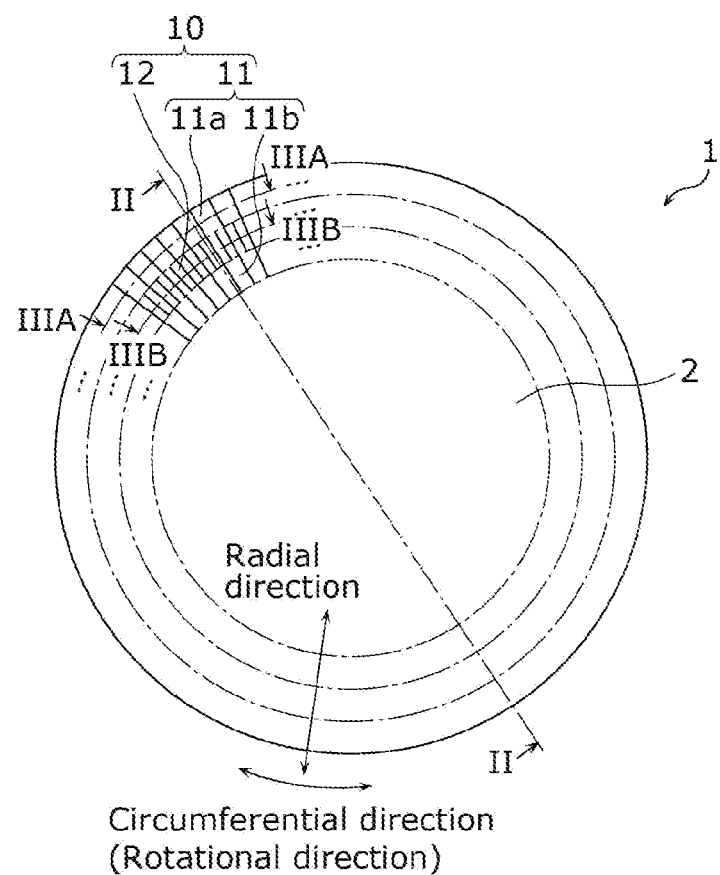
FIG. 1 is a top view of a rotating plate in an encoder according to Embodiment 1.

Embodiments of the present disclosure will be described below with reference to the drawings. Note that all the embodiments described below are specific examples of the present disclosure. Therefore, the numerical values, shapes, materials, components, arrangement positions of the components, connection forms, and the like shown in the following embodiments are examples and are not intended to limit the present disclosure. Accordingly, among the components in the following embodiments, components that are not described in the independent claims indicating the highest-level concepts of the present disclosure will be described as optional components.

Note that each drawing is a schematic view and is not necessarily a strict illustration. Thus, in each drawing, the scale and other details are not necessarily the same. Further, in each drawing, substantially the same component is denoted by the same reference numeral, and redundant descriptions will be omitted or simplified.

Embodiment 1

Figure 2:
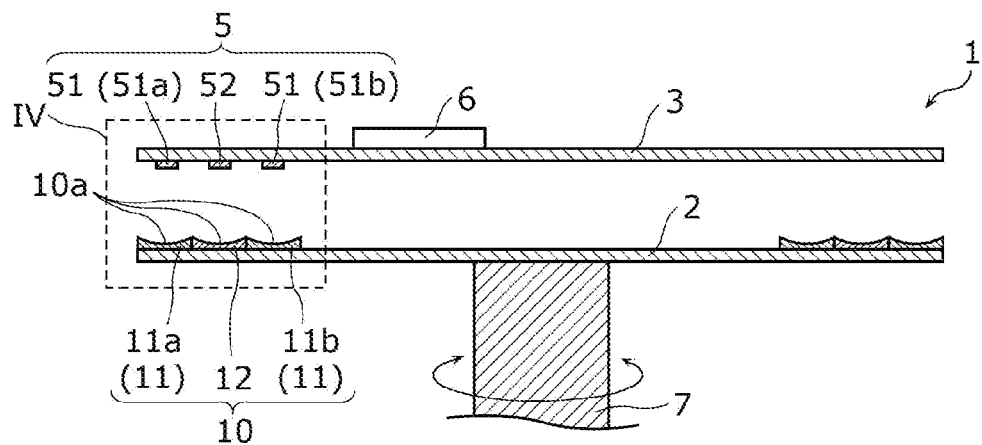
FIG. 2 is a cross-sectional view of the encoder according to Embodiment 1, taken along line II-II of FIG. 1.
Figure 3A:
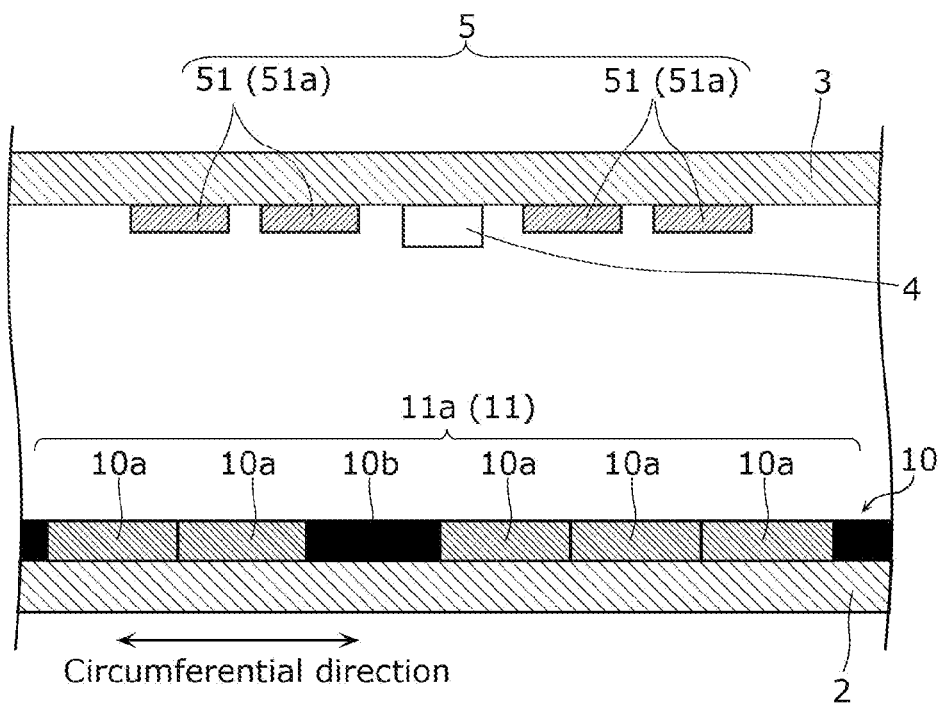
FIG. 3A is a cross-sectional view of the encoder according to Embodiment 1, taken along line IIIA-IIIA of FIG. 1.
Figure 3B:
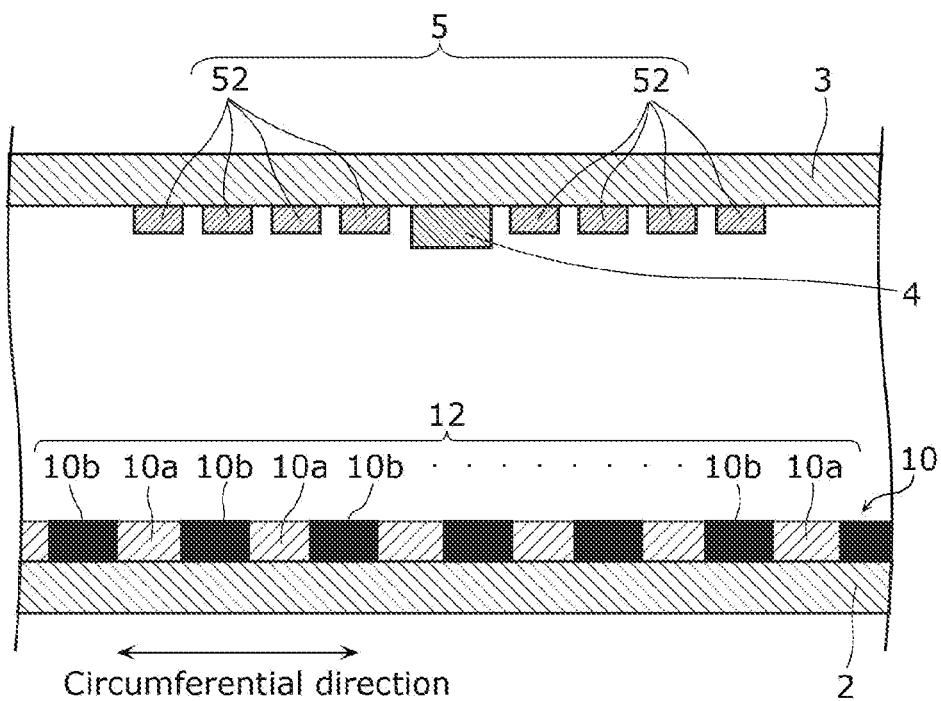
FIG. 3B is a cross-sectional view of the encoder according to Embodiment 1, taken along line IIIB-IIIB of FIG. 1.
Figure 4:
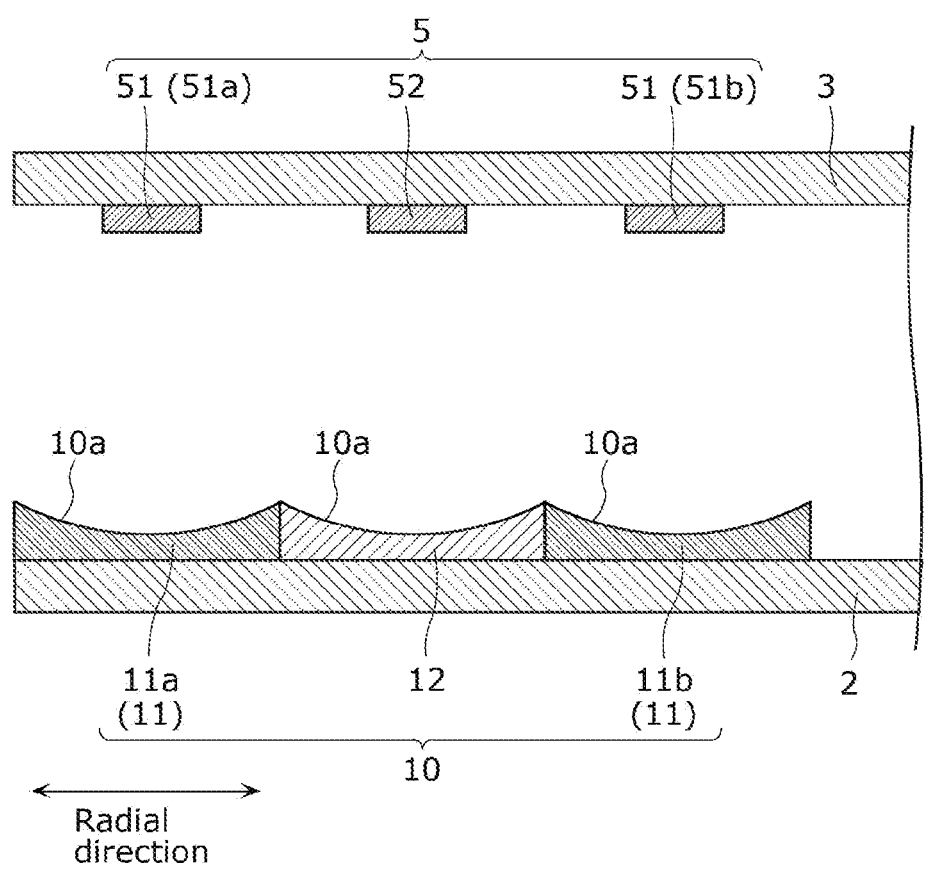
FIG. 4 is an enlarged cross-sectional view of the encoder according to Embodiment 1.

First, the configuration of encoder 1 according to Embodiment 1 will be described with reference to FIGS. 1 to 4. FIG. 1 is a top view of rotating plate 2 in encoder 1 according to Embodiment 1. FIG. 2 is a cross-sectional view of same encoder 1, taken along line II-II of FIG. 1. FIGS. 3A and 3B are cross-sectional views of same encoder 1 in the circumferential cross-section of rotating plate 2. FIG. 3A is a cross-sectional view taken along line IIIA-IIIA of FIG. 1, and FIG. 3B is a cross-sectional view taken along line IIIB-IIIB of FIG. 1. FIG. 4 is an enlarged cross-sectional view of region IV surrounded by a broken line in FIG. 2. Note that FIG. 1 schematically illustrates code pattern 10.

Encoder 1 illustrated in FIGS. 1 and 2 is an optical rotary encoder. Encoder 1 in the present embodiment is a light-reflection-type rotary encoder. Encoder 1 is used in conjunction with a motor such as a servo motor, for example. In this case, for example, encoder 1 detects rotational displacement in the angle of rotation, number of rotations, or the like, of the rotation shaft of the motor.

As illustrated in FIGS. 1 and 2, encoder 1 according to the present embodiment includes rotating plate 2, fixed portion 3, irradiator 4, light receiver 5, and processor 6.

Rotating plate 2 is a rotating substrate. The rotational direction of rotating plate 2 is both clockwise and counterclockwise, but is not limited thereto. For example, the rotational direction of rotating plate 2 may be either clockwise or counterclockwise. Rotating plate 2 is made of metal, for example, but may be made of resin, glass, or ceramic. Rotating plate 2 is, for example, a circular flat plate.

As illustrated in FIG. 2, rotation shaft 7 is attached to the central portion of rotating plate 2. As rotation shaft 7 rotates, rotating plate 2 rotates about rotation shaft 7. The rotating motion of rotation shaft 7 is synchronized with the rotating motion of rotating equipment. Rotation shaft 7 is, for example, the very rotation shaft of the motor such as the servo motor.

As illustrated in FIGS. 1 and 2, rotating plate 2 has code pattern 10 for detecting rotational displacement. Encoder 1 can detect rotational displacement in the angle of rotation (rotational position) or the like of rotating plate 2 by means of code pattern 10. Code pattern 10 is formed of a plurality of unit patterns (single regions) with a predetermined shape provided in a row along the circumferential direction (rotational direction) of rotating plate 2, corresponding to the angle of rotation. The unit pattern is, for example, a slit provided on rotating plate 2.

In the present embodiment, code pattern 10 includes absolute pattern 11 and incremental pattern 12. Absolute pattern 11 and incremental pattern 12 are provided at different positions in the radial direction of rotating plate 2. That is, absolute pattern 11 and incremental pattern 12 are provided in different lanes (tracks) of rotating plate 2.

Absolute pattern 11 is a pattern for detecting an absolute position. Specifically, absolute pattern 11 is a pattern for detecting an absolute angular position in rotating plate 2. The plurality of unit patterns constituting absolute pattern 11 are provided in a row over the entire circumference of rotating plate 2. As an example, absolute pattern 11 is a code pattern represented by a pseudo-random code such as an M-code (M-sequence code) with a predetermined number of bits. Note that absolute pattern 11 is not limited to the M-code, and may be a gray code, a binary code, a binary-coded decimal (BCD) code, or the like.

In the present embodiment, absolute pattern 11 includes first absolute pattern 11a and second absolute pattern 11b provided at different positions in the radial direction of rotating plate 2. First absolute pattern 11a is provided at a position radially outward of second absolute pattern 11b.

Incremental pattern 12 is a pattern for detecting the relative position on rotating plate 2. Specifically, incremental pattern 12 is a pattern for detecting a relative angular position in rotating plate 2. The plurality of unit patterns constituting incremental pattern 12 are provided in a row over the entire circumference of rotating plate 2.

Incremental pattern 12 is provided between first absolute pattern 11a and second absolute pattern 11b in the radial direction of rotating plate 2. Specifically, first absolute pattern 11a, incremental pattern 12, and second absolute pattern 11b are provided in stated order from the outside to the inside in the radial direction. In this manner, code pattern 10 is formed of three lanes for first absolute pattern 11a, incremental pattern 12, and second absolute pattern 11b.

Note that code pattern 10 is provided at the radial end of rotating plate 2. Specifically, first absolute pattern 11a is formed at the extreme end of rotating plate 2 in the radial direction. Therefore, first absolute pattern 11a is formed on the outermost circumferential lane (outermost circumferential track) of rotating plate 2. Incremental pattern 12 is provided in line with and adjacent to first absolute pattern 11a, and second absolute pattern 11b is provided in line with and adjacent to incremental pattern 12.

As illustrated in FIGS. 3A, 3B, and 4, rotating plate 2 includes light-reflective portion 10a and non-light-reflective portion 10b. In the present embodiment, code pattern 10 includes light-reflective portion 10a and non-light-reflective portion 10b. That is, each of absolute pattern 11 and incremental pattern 12 is formed of light-reflective portion 10a and non-light-reflective portion 10b.

Specifically, as illustrated in FIG. 3A, absolute pattern 11 is formed of a plurality of light-reflective portions 10a and a plurality of non-light-reflective portions 10b arranged in a predetermined pattern. In other words, each of first absolute pattern 11a and second absolute pattern 11b is formed of a plurality of light-reflective portions 10a and a plurality of non-light-reflective portions 10b. Although FIG. 3A illustrates only first absolute pattern 11a, second absolute pattern 11b is also formed of a plurality of light-reflective portions 10a and a plurality of non-light-reflective portions 10b.

In absolute pattern 11, each of light-reflective portion 10a and non-light-reflective portion 10b is a unit pattern, and is the minimum unit for reading when the position of rotating plate 2 is detected. Light-reflective portions 10a and non-light-reflective portions 10b in absolute pattern 11 are repeatedly provided along the circumferential direction of rotating plate 2 in such an order as to constitute a code pattern, such as an M-code.

For all the unit patterns (light-reflective portion 10a and non-light-reflective portion 10b) in absolute pattern 11, each spacing between two adjacent unit patterns is the same. That is, the unit patterns of absolute pattern 11 have the same pitch (regular spacing) over the entire circumference of rotating plate 2. Note that the pitch of first absolute pattern 11a and the pitch of second absolute pattern 11b are the same, but may be different.

As illustrated in FIG. 3B, incremental pattern 12 is formed of a plurality of light-reflective portions 10a and a plurality of non-light-reflective portions 10b arranged in a predetermined pattern. In incremental pattern 12, light-reflective portion 10a is a unit pattern, and is the minimum unit for reading when the position of rotating plate 2 is detected. Light-reflective portions 10a in incremental pattern 12 are repeatedly provided along the circumferential direction of rotating plate 2, corresponding to the angle of rotation. In the present embodiment, incremental pattern 12 is an array in which light-reflective portions 10a and non-light-reflective portions 10b are alternately repeated one by one.

Thus, in incremental pattern 12, one light-reflective portion 10a and one non-light-reflective portion 10b constitute one pitch. Incremental pattern 12 has the same pitch over the entire circumference of rotating plate 2. That is, in incremental pattern 12, the spacing between each pair of patterns (corresponding to one pitch) formed of one light-reflective portion 10a and one non-light-reflective portion 10b is the same.

The width per pitch of absolute pattern 11 is smaller than the width per pitch of incremental pattern 12. In the present embodiment, the width per pitch of absolute pattern 11 is half the width per pitch of incremental pattern 12. In other words, one pitch in absolute pattern 11 is half as wide as one pitch in incremental pattern 12, and two pitches of absolute pattern 11 correspond to one pitch of incremental pattern 12.

As illustrated in FIGS. 3A, 3B, and 4, the plurality of light-reflective portions 10a and the plurality of non-light-reflective portions 10b are provided on the main surface of rotating plate 2 on the side of fixed portion 3. The plurality of light-reflective portions 10a are light-reflective objects (light-reflective portion structures) that reflect light emitted from irradiator 4. The light reflected by each light-reflective portion 10a is incident on light receiver 5. That is, light incident on each light-reflective portion 10a is reflected by light-reflective portion 10a and incident on light receiver 5. On the other hand, non-light-reflective portion 10b is a non-light-reflective object that does not reflect light. Non-light-reflective portion 10b is, for example, a light-absorbing object that absorbs light or a light-transmissive object that transmits light. In other words, non-light-reflective portion 10b only needs to be configured so that light incident on non-light-reflective portion 10b is not incident on light receiver 5.

Rotating plate 2 has at least one curve. In the present embodiment, rotating plate 2 includes a plurality of curved surfaces on its surface. Specifically, as illustrated in FIG. 4, code pattern 10 includes a plurality of curved surfaces. Specifically, as the plurality of curved surfaces, each of light-reflective portion 10a and non-light-reflective portion 10b constituting code pattern 10 includes a concave curved surface. That is, a concave curved surface is formed on the surface of each of light-reflective portion 10a and non-light-reflective portion 10b constituting absolute pattern 11 and incremental pattern 12. As an example, light-reflective portion 10a and non-light-reflective portion 10b constituting absolute pattern 11 and incremental pattern 12 are slits (slit patterns) including concave curved surfaces. The curved surface formed on the surface of each light-reflective portion 10a is a light-reflective surface that reflects light. The curved surface formed on the surface of each non-light-reflective portion 10b is a non-light-reflective surface that does not reflect light.

In the present embodiment, the curved surface of each of light-reflective portion 10a and non-light-reflective portion 10b has a shape provided with curvature in the radial direction of rotating plate 2. Specifically, as illustrated in FIG. 3A, FIG. 3B, and FIG. 4, in both absolute pattern 11 and incremental pattern 12, the surface of each of light-reflective portion 10a and non-light-reflective portion 10b is a curved surface provided with curvature only in the radial direction, out of the radial direction and the circumferential direction of rotating plate 2, and no curvature is provided in the circumferential direction of rotating plate 2. As an example, the surface of each of light-reflective portion 10a and non-light-reflective portion 10b is a concave cylindrical surface having a cylindrical axis in the circumferential direction of rotating plate 2. Note that, out of light-reflective portion 10a and non-light-reflective portion 10b, only the surface of light-reflective portion 10a may be a curved surface, and the surface of non-light-reflective portion 10b may be a flat surface.

As illustrated in FIGS. 1 and 2, fixed portion 3 is disposed facing rotating plate 2. Fixed portion 3 is a member that does not rotate even when rotating plate 2 rotates. In the present embodiment, fixed portion 3 is a circular flat substrate. Fixed portion 3 is, for example, a wiring board such as FR-4, and is disposed parallel to rotating plate 2 at a position a predetermined distance from rotating plate 2. In this case, fixed portion 3 is disposed so that the center of fixed portion 3 coincides with the axis of rotation shaft 7. Fixed portion 3 is fixed, for example, to a case (not illustrated) constituting a part of encoder 1 or the motor.

Fixed portion 3 is provided with irradiator 4, light receiver 5, and processor 6. For example, irradiator 4, light receiver 5, and processor 6 are mounted as electronic components on fixed portion 3 that is the wiring board. Irradiator 4 and light receiver 5 are mounted, for example, on the surface of fixed portion 3 on the side of rotating plate 2. In this case, irradiator 4 and light receiver 5 may be integrated as an optical module. Processor 6 is mounted on the surface of fixed portion 3 opposite to rotating plate 2. Note that the location where processor 6 is mounted is not limited thereto, and processor 6 may be mounted, for example, on the surface of fixed portion 3 on the side of rotating plate 2. Electronic components and other units other than irradiator 4, light receiver 5, and processor 6 may be mounted on fixed portion 3.

Irradiator 4 is a light source that irradiates rotating plate 2 with light. Irradiator 4 simultaneously irradiates each of a plurality of surfaces including the curved surface of rotating plate 2 with light. In the present embodiment, irradiator 4 simultaneously irradiates each of a plurality of curved surfaces of rotating plate 2 with light. Specifically, each of the plurality of light-reflective portions 10a constituting code pattern 10 is simultaneously irradiated with light. In this case, each of a plurality of light-reflective portions 10a in at least a part of one of first absolute pattern 11a, second absolute pattern 11b, or incremental pattern 12 is simultaneously irradiated with light. For example, only a plurality of light-reflective portions 10a in a part of first absolute pattern 11a may each be simultaneously irradiated with light, only a plurality of light-reflective portions 10a in a part of second absolute pattern 11b may each be simultaneously irradiated with light, only a plurality of light-reflective portions 10a in a part of incremental pattern 12 may each be simultaneously irradiated with light, and a plurality of light-reflective portions 10a in a part of first absolute pattern 11a, a plurality of light-reflective portions 10a in a part of second absolute pattern 11b, and a plurality of light-reflective portions 10a in a part of incremental pattern 12 may each be simultaneously irradiated with light. When each of the plurality of light-reflective portions 10a is simultaneously irradiated with light, non-light-reflective portion 10b is also irradiated with light. The light emitted from irradiator 4 is emitted onto code pattern 10 without being condensed by a condensing member such as a lens.

In the present embodiment, irradiator 4 is a single point light source. That is, light from irradiator 4 being the single point light source is simultaneously incident on each of the curved surfaces of the plurality of light-reflective portions 10a in first absolute pattern 11a, second absolute pattern 11b, and incremental pattern 12. As illustrated in FIG. 3B, irradiator 4 is disposed to face incremental pattern 12, for example. As illustrated in FIG. 3B, irradiator 4 is disposed in the same row as the plurality of second light-receiving elements 52. In other words, irradiator 4 and the plurality of second light-receiving elements 52 are arranged in a row.

The layout of the plurality of first light-receiving elements 51 and second light-receiving elements 52 is also changed according to the layout of absolute pattern 11 and incremental pattern 12, so that irradiator 4 is not necessarily disposed in the same row (same lane) as the plurality of second light-receiving elements 52. For example, irradiator 4 may be disposed in the same row as the plurality of first light-receiving elements 51, or may be disposed in a lane different from both the plurality of first light-receiving elements 51 and the plurality of second light-receiving elements 52.

Irradiator 4 is formed of a light-emitting element such as a light-emitting diode (LED). The light emitted from irradiator 4 is visible light such as white light, but is not limited thereto. The light emitted from irradiator 4 may be, for example, infrared light.

Light receiver 5 receives the light which has been emitted from irradiator 4 and traveled via rotating plate 2. In the present embodiment, light receiver 5 receives the light emitted from irradiator 4 and reflected by code pattern 10. That is, light receiver 5 receives the light reflected by the curved surface (reflective surface) of light-reflective portion 10a in code pattern 10. Specifically, light receiver 5 simultaneously receives the light reflected by each of the plurality of light-reflective portions 10a in at least one of first absolute pattern 11a, second absolute pattern 11b, or incremental pattern 12. In the present embodiment, the light reflected by the curved surface of light-reflective portion 10a in code pattern 10 is incident on light receiver 5 without being condensed by a condensing member such as a lens.

Light receiver 5 is formed of a light-receiving element such as a photo diode (PD). In the present embodiment, light receiver 5 includes a plurality of light-receiving elements.

Specifically, light receiver 5 includes: a first light-receiving element group, where a plurality of first light-receiving elements 51 are arranged in the circumferential direction to each receive light which has been emitted from irradiator 4 and traveled via absolute pattern 11; and a second light-receiving element group, where a plurality of second light-receiving elements 52 are arranged in the circumferential direction to each receive light which has been emitted from irradiator 4 and traveled via incremental pattern 12. In the present embodiment, first light-receiving element 51 includes first light-receiving element 51a for receiving light that has traveled via first absolute pattern 11a, and first light-receiving elements 51b for receiving light that has traveled via second absolute pattern 11b.

As illustrated in FIG. 3A, a plurality of first light-receiving elements 51a are arranged to face first absolute pattern 11a. As illustrated in FIG. 3B, a plurality of second light-receiving elements 52 are arranged to face incremental pattern 12. Although not illustrated, a plurality of first light-receiving elements 51b are arranged to face second absolute pattern 11b.

The light emitted from irradiator 4 via absolute pattern 11 and the light emitted from irradiator 4 via incremental pattern 12 are simultaneously received by the first light-receiving element group including the plurality of first light-receiving elements 51 and the second light-receiving element group including the plurality of second light-receiving elements 52, respectively. That is, light beams, which are resultant light beams of the light emitted from irradiator 4 and reflected by the curved surfaces of light-reflective portions 10a in absolute pattern 11 and incremental pattern 12, are all simultaneously received by the plurality of first light-receiving elements 51 and the plurality of second light-receiving elements 52.

The plurality of first light-receiving elements 51a, the plurality of first light-receiving elements 51b, and the plurality of second light-receiving elements 52 are each mounted on fixed portion 3 in a row, for example. The plurality of first light-receiving elements 51a, the plurality of first light-receiving elements 51b, and the plurality of second light-receiving elements 52 may each be integrated as a light-receiving module. The plurality of first light-receiving elements 51a, the plurality of first light-receiving elements 51b, and the plurality of second light-receiving elements 52 may all be integrated into one to form a light-receiving module.

Note that light receiver 5 may not be formed of a plurality of light-receiving elements. For example, light receiver 5 may be formed of an image sensor (imaging element) or the like having a light-receiving surface capable of simultaneously receiving light reflected by each of the curved surfaces of the plurality of light-reflective portions 10a in absolute pattern 11 and incremental pattern 12.

Processor 6 illustrated in FIG. 2 is connected to light receiver 5. Processor 6 calculates information related to a change in the position of rotating plate 2, based on the light-receiving positions of the plurality of first light-receiving elements 51 and second light-receiving elements 52 in light receiver 5. For example, processor 6 calculates the angle of rotation, the number of rotations, the rotation position, the rotation speed, and the like of rotating plate 2 as the information related to the change in the position of rotating plate 2. Processor 6 is, for example, an integrated circuit (IC) package or the like.

Figure 5:
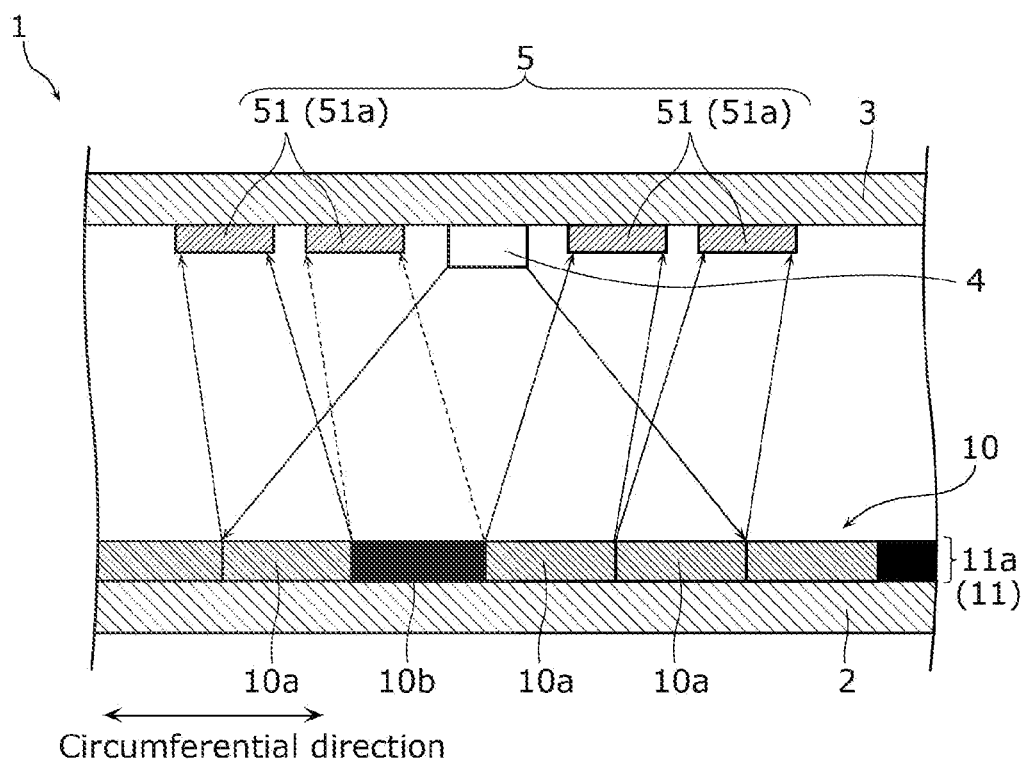
FIG. 5 is a view illustrating a traveling state of light in the circumferential cross-section of the rotating plate in the encoder according to Embodiment 1.
Figure 6:
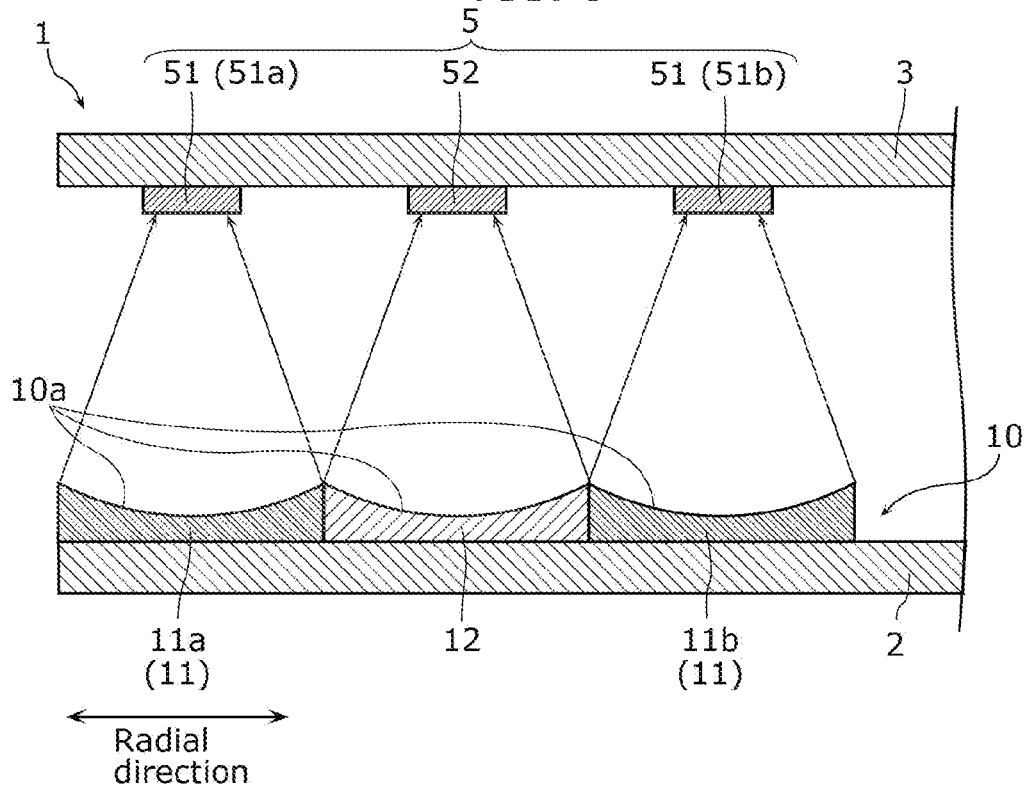
FIG. 6 is a view illustrating a traveling state of light in a radial cross-section of the rotating plate in the encoder according to Embodiment 1.

Next, the optical action of light-reflective portion 10a in encoder 1 according to the present embodiment will be described with reference to FIGS. 5 and 6. FIG. 5 is a view illustrating a traveling state of light in the circumferential cross-section of rotating plate 2 in encoder 1 according to Embodiment 1, and FIG. 6 is a view illustrating a traveling state of light in the radial cross-section of rotating plate 2 in same encoder 1. Note that FIG. 5 illustrates only the trajectory of light emitted from irradiator 4 and incident on first absolute pattern 11a.

As illustrated in FIGS. 5 and 6, when light emitted from irradiator 4 is incident on first absolute pattern 11a, the light incident on light-reflective portion 10a, out of the light incident on first absolute pattern 11a, is reflected by light-reflective portion 10a and is incident on first light-receiving element 51a. In this case, since there is a one-to-one correspondence between light-reflective portion 10a and first light-receiving element 51a, the light beams reflected by the plurality of respective light-reflective portions 10a are incident on the plurality of respective first light-receiving elements 51a.

At this time, as illustrated in FIG. 6, since the surface of light-reflective portion 10a is a concave curved surface having curvature in the radial direction of rotating plate 2, the light reflected by light-reflective portion 10a is condensed to be narrowed in the radial direction of rotating plate 2 and is incident on the light-receiving surface (light-receiving region) of first light-receiving element 51a.

On the other hand, as illustrated in FIG. 5, the light incident on non-light-reflective portion 10b, out of the light incident on first absolute pattern 11a, is not reflected by light-reflective portion 10a. For example, the light incident on non-light-reflective portion 10b is absorbed by non-light-reflective portion 10b.

Note that FIG. 5 illustrates only the trajectory of the light incident on first absolute pattern 11a, but the light incident on second absolute pattern 11b and the light incident on incremental pattern 12 follow similar trajectories to that of the light incident on first absolute pattern 11a. That is, for second absolute pattern 11b and incremental pattern 12 as well, since the surface of light-reflective portion 10a is a concave curved surface having curvature in the radial direction of rotating plate 2, the light reflected by light-reflective portion 10a in second absolute pattern 11b and the light reflected by light-reflective portion 10a in incremental pattern 12 are condensed to be narrowed in the radial direction of rotating plate 2 and are incident on first light-receiving element 51b and second light-receiving element 52, respectively.

Next, the effects of encoder 1 according to the present embodiment will be described in comparison with encoder 1X of the comparative example. An optical simulation was performed for each of the light reflection actions of light-reflective portion 10a in encoder 1 according to the present embodiment and light-reflective portion 10aX in encoder 1X of the comparative example, and a description will thus be provided along with the simulation results.

Figure 7:
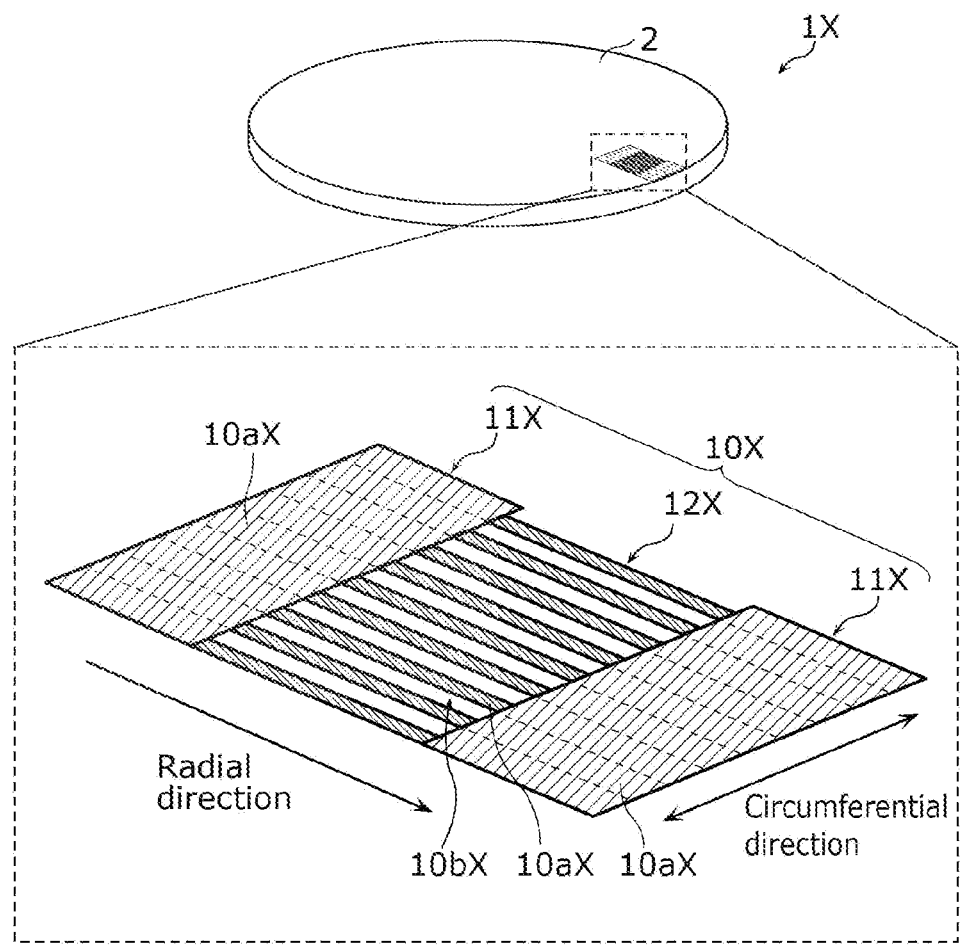
FIG. 7 is a view schematically illustrating a configuration of an encoder according to a comparative example used in optical simulation.

FIG. 7 is a view schematically illustrating a configuration of encoder 1X of a comparative example used in this simulation. As illustrated in FIG. 7, encoder 1X of the comparative example has code pattern 10X including absolute pattern 11X and incremental pattern 12X, similarly to encoder 1 in the present embodiment. However, in encoder 1X of the comparative example, the surface of light-reflective portion 10aX constituting code pattern 10X is a flat surface instead of a curved surface. In encoder 1X of the comparative example, in code pattern 10X illustrated in FIG. 7, absolute pattern 11X is a pattern in which only a plurality of light-reflective portions 10aX are arranged, and incremental pattern 12X is a pattern in which light-reflective portion 10aX and non-light-reflective portions 10bx are arranged alternately.

Figure 8:
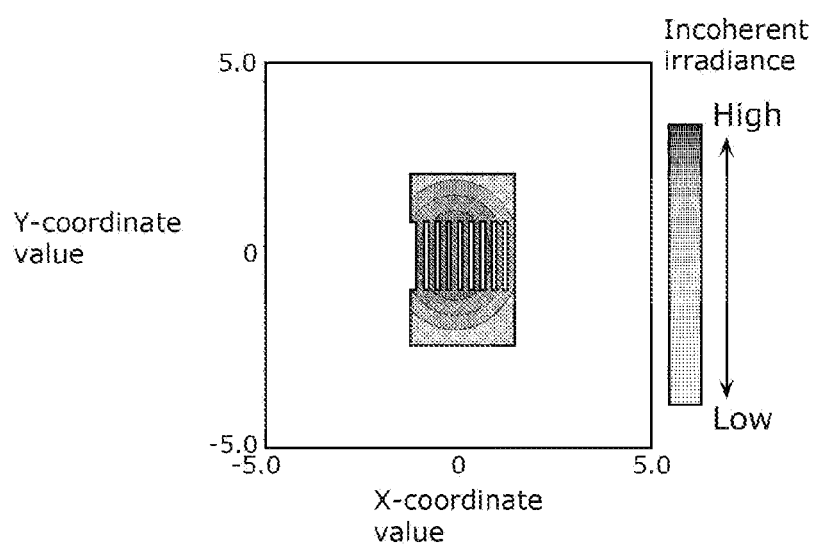
FIG. 8 is a view illustrating an irradiation pattern and a light intensity distribution of reflected light in the code pattern of the encoder according to the comparative example.

In this case, when code pattern 10X illustrated in FIG. 7 is irradiated with light from an irradiator formed of a single point light source disposed to face incremental pattern 12X, an irradiation pattern and a light intensity distribution as illustrated in FIG. 8 are obtained. Note that this simulation assumed a light receiver capable of simultaneously receiving light reflected by every light-reflective portion 10aX of code pattern 10X illustrated in FIG. 7.

As illustrated in FIG. 8, in encoder 1X of the comparative example, the irradiation spot of the light reflected by each light-reflective portion 10aX in absolute pattern 11X and the irradiation spot of the light reflected by each light-reflective portion 10aX in incremental pattern 12X are connected integrally.

In encoder 1X of the comparative example configured as described above, When the light beams reflected by the plurality of respective light-reflective portions 10aX in code pattern 10X are received by light receiver 5 of encoder 1 in the above embodiment, the light beams reflected by light-reflective portions 10aX are received by the respective light-receiving elements in light receiver 5.

Figure 9:
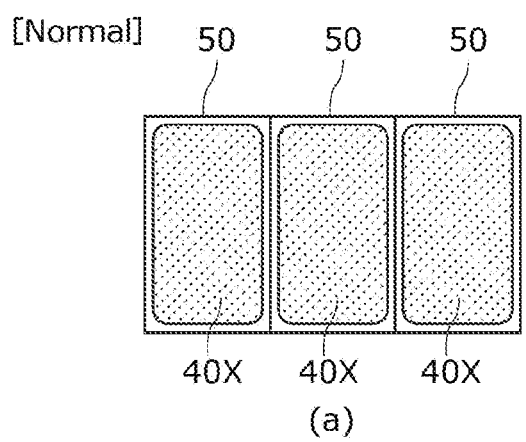
FIG. 9 is a view for explaining the optical action of the code pattern of the encoder according to the comparative example.
Figure 9:
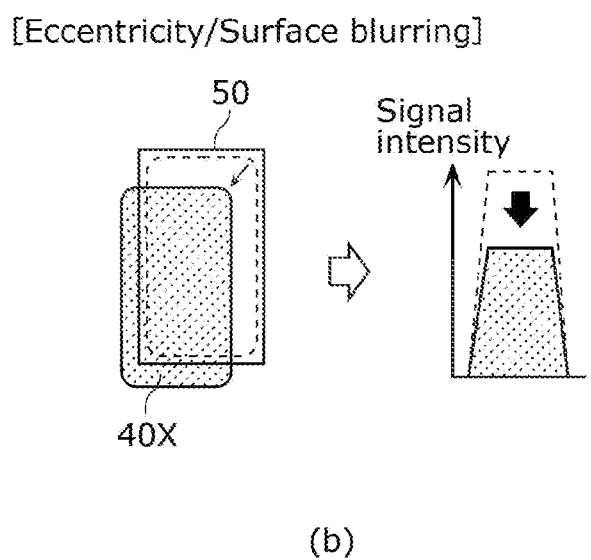

At this time, as illustrated in (a) in FIG. 9, in a normal state where neither eccentricity nor surface blurring has occurred, irradiation spot 40X (light spot) of the light, reflected by light-reflective portion 10aX, in light-receiving region 50 of each light-receiving element does not extend beyond a predetermined range of light-receiving region 50 and falls within the predetermined range of light-receiving region 50.

However, as illustrated in (a) in FIG. 9, the size of light-receiving region 50 is designed to match the size of irradiation spot 40X, and hence there is no spatial margin between irradiation spot 40X and light-receiving region 50. That is, the size of light-receiving region 50 is only slightly larger than the size of irradiation spot 40X.

For this reason, when eccentricity or surface blurring occurs and irradiation spot 40X is displaced from the predetermined position, as illustrated in the left view of (b) in FIG. 9, a part of irradiation spot 40X of the light received by the light-receiving element may extend beyond the predetermined range of light-receiving region 50. Thus, the part extending beyond the predetermined range of light-receiving region 50 leads to a reduction in amount of light, and as illustrated in the right view of (b) in FIG. 9, the signal intensity of the light received by the light-receiving element decreases. As a result, the angle of rotation or the like cannot be correctly detected, which may induce erroneous detection.

Figure 10:
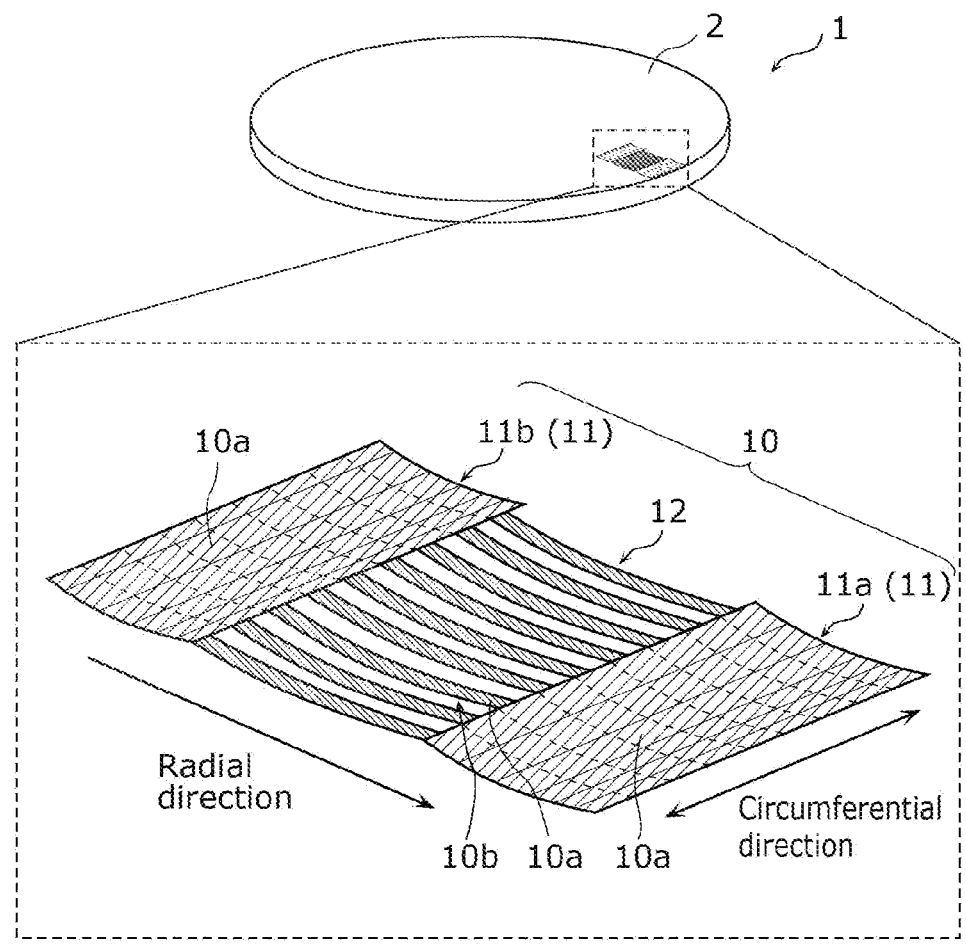
FIG. 10 is a view schematically illustrating the configuration of the encoder according to Embodiment 1 used in optical simulation.

FIG. 10 is a view schematically illustrating the configuration of encoder 1 according to Embodiment 1 used in this simulation. As illustrated in FIG. 10, in encoder 1 in the present embodiment, the surface of light-reflective portion 10a constituting code pattern 10 is a concave curved surface having curvature only in the radial direction of rotating plate 2. In code pattern 10 illustrated in FIG. 10, absolute pattern 11 is a pattern in which only a plurality of light-reflective portions 10a are arranged, and incremental pattern 12 is a pattern in which light-reflective portions 10a and non-light-reflective portions 10b are arranged alternately.

Figure 11:
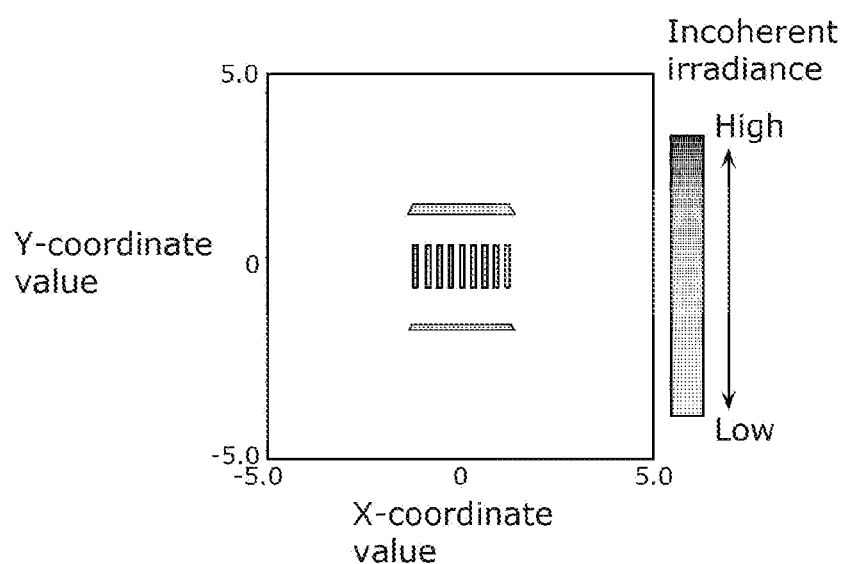
FIG. 11 is a view illustrating an irradiation pattern and a light intensity distribution of reflected light in the code pattern of the encoder according to Embodiment 1.

In this case, when code pattern 10 illustrated in FIG. 10 is irradiated with light from irradiator 4 formed of a single point light source disposed to face incremental pattern 12, an irradiation pattern and a light intensity distribution as illustrated in FIG. 11 are obtained. Note that this simulation also assumed a light receiver capable of simultaneously receiving light reflected by every light-reflective portion 10a of code pattern 10 illustrated in FIG. 10.

In encoder 1 according to the present embodiment, since the surface of light-reflective portion 10a in code pattern 10 is a concave curved surface having curvature in the radial direction of rotating plate 2, the light beams reflected by the surfaces of respective light-reflective portions 10a are condensed so as to be reduced in width in the radial direction of rotating plate 2 and are received by the respective light-receiving elements.

Thus, as illustrated in FIG. 11, the irradiation spot of the light reflected by each light-reflective portion 10a in absolute pattern 11 and the irradiation spot of the light reflected by each light-reflective portion 10a in incremental pattern 12 are separated in the radial direction of rotating plate 2. Specifically, the irradiation spots are separated for the respective lanes for first absolute pattern 11a, incremental pattern 12, and second absolute pattern 11b.

In encoder 1 configured as described above, when the light beams reflected by the plurality of respective light-reflective portions 10a in code pattern 10 are received by light receiver 5, the light beams reflected by light-reflective portions 10a are received by the respective light-receiving elements in light receiver 5.

Figure 12:
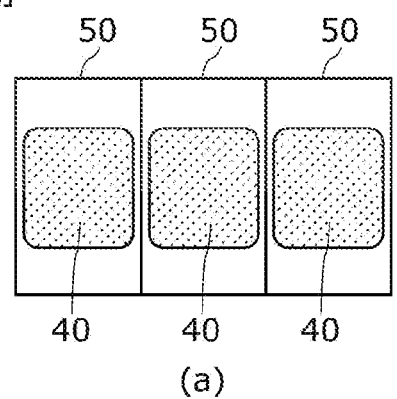
FIG. 12 is a view for explaining the optical action of the code pattern of the encoder according to Embodiment 1.
Figure 12:
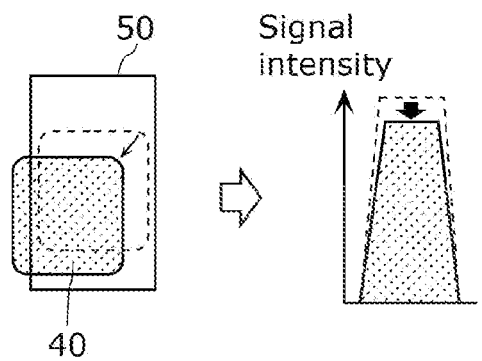

At this time, as illustrated in (a) in FIG. 12, in a normal state where neither eccentricity nor surface blurring has occurred, irradiation spot 40 of the light, reflected by light-reflective portion 10a, in light-receiving region 50 of each light-receiving element does not extend beyond the predetermined range of light-receiving region 50, and falls within the predetermined range of light-receiving region 50.

In encoder 1 according to the present embodiment, since the surface of light-reflective portion 10a is a concave curved surface having curvature in the radial direction of rotating plate 2, the length of irradiation spot 40 in light-receiving region 50 in the radial direction of rotating plate 2 is shorter than that in encoder 1X of the comparative example. That is, irradiation spot 40 has a shorter spot diameter in the radial direction of rotating plate 2 and is thus smaller than encoder 1X of the comparative example.

Thereby, even when eccentricity or surface blurring occurs to cause the displacement in the position of irradiation spot 40 and the extension of a part of irradiation spot 40 beyond the predetermined range of light-receiving region 50 as illustrated in the left view of (b) in FIG. 12, the amount of extension can be made smaller than that in encoder 1X of the comparative example.

As a result, as illustrated in the right view of (b) in FIG. 12, it is possible to inhibit a decrease in the signal intensity of the light received by the light-receiving element when a part of irradiation spot 40 extends beyond the predetermined range of light-receiving region 50. That is, in encoder 1 according to the present embodiment, the change in signal intensity due to the movement of irradiation spot 40 is smaller than that in encoder 1X of the comparative example. This can inhibit the occurrence of erroneous detection.

As described above, in encoder 1 according to the present embodiment, at least one curved surface is provided on the surface of rotating plate 2, and irradiator 4 simultaneously irradiates each of a plurality of surfaces including the curved surface with light. In the present embodiment, a plurality of curved surfaces are provided on the surface of rotating plate 2, and irradiator 4 simultaneously irradiates each of the plurality of curved surfaces with light.

Specifically, in encoder 1 according to the present embodiment, each of light-reflective portion 10a and nonlight-reflective portion 10b constituting absolute pattern 11 and incremental pattern 12, which are provided on rotating plate 2 as code pattern 10, includes a concave curved surface.

With this configuration, even when the position of irradiation spot 40 is displaced, the occurrence of erroneous detection can be inhibited. Therefore, even when the number of bits of code pattern 10 is increased for a high position resolution, erroneous detection associated with eccentricity or surface blurring can be inhibited. As described above, according to encoder 1 of the present embodiment, it is possible to increase the precision of code pattern 10 and perform position detection with high accuracy.

Moreover, in encoder 1 according to the present embodiment, since irradiation spot 40 can be made smaller, light-receiving region 50 of each light-receiving element can be made smaller. This can reduce the size of the light-receiving element, thus achieving a cost reduction. Further, reducing the size of the light-receiving element can reduce the capacitance of the light-receiving element, thus realizing a fast response. That is, it is possible to increase the detection speed of the angle of rotation or the like.

Embodiment 2

Figure 13A:
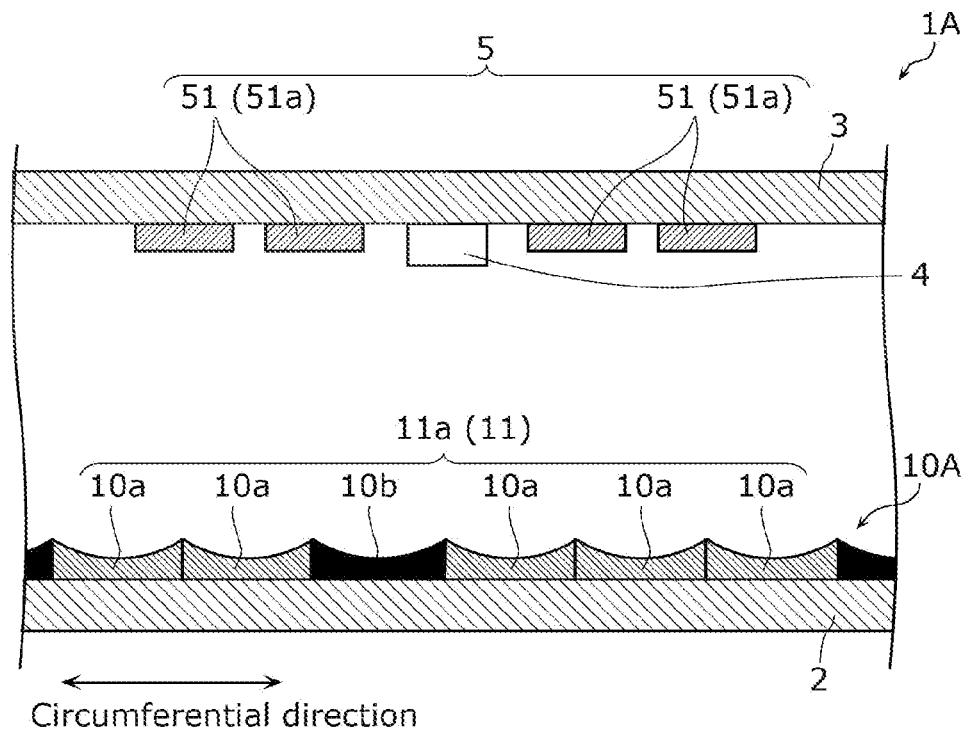
FIG. 13A is a cross-sectional view of an encoder according to Embodiment 2 in a circumferential cross-section of a rotating plate, taken along a first absolute pattern
Figure 13B:
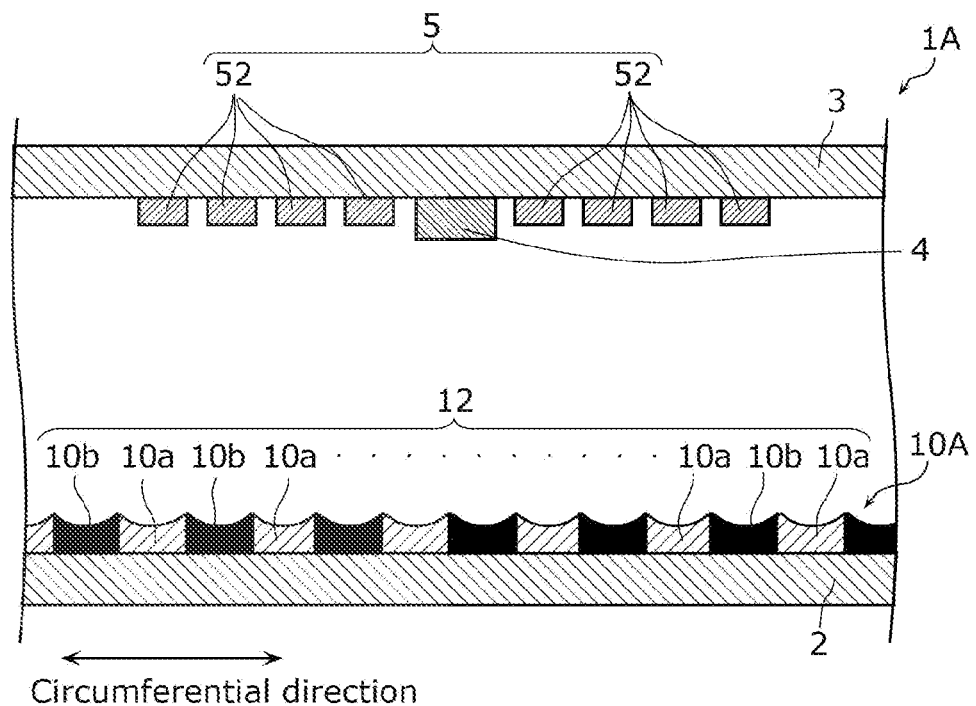
FIG. 13B is a cross-sectional view of the encoder according to Embodiment 2 in a circumferential cross-section of the rotating plate, taken along an incremental pattern.
Figure 14:
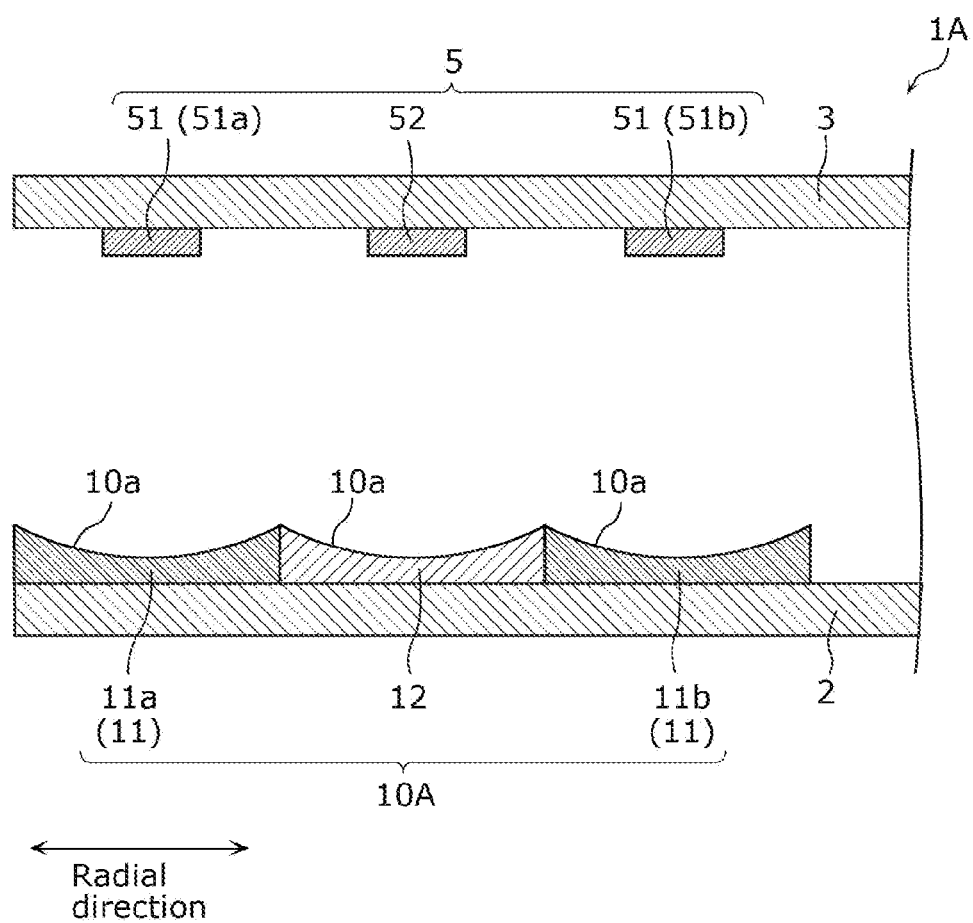
FIG. 14 is an enlarged cross-sectional view of the encoder according to Embodiment 2 in a radial cross-section of the rotating plate.

Next, encoder 1A according to Embodiment 2 will be described with reference to FIGS. 13A, 13B, and 14. FIGS. 13A and 13B are cross-sectional views of encoder 1A according to Embodiment 2 in the circumferential cross-section of rotating plate 2. FIG. 13A is a cross-section taken along first absolute pattern 11a, and FIG. 13B is a cross-section taken along incremental pattern 12. FIG. 14 is an enlarged cross-sectional view of same encoder 1A in the radial cross-section of rotating plate 2. FIG. 13A, FIG. 13B, and FIG. 14 correspond to FIG. 3A, FIG. 3B, and FIG. 4 in Embodiment 1 above.

Encoder 1A according to the present embodiment differs from encoder 1 according to Embodiment 1 above in the shape of the surface of light-reflective portion 10a in code pattern 10A. Specifically, in encoder 1 according to Embodiment 1 above, the surface of light-reflective portion 10a in code pattern 10 has been the curved surface provided with curvature only in the radial direction of rotating plate 2, but in encoder 1A according to the present embodiment, as illustrated in FIGS. 13A, 13B, and 14, the surface of light-reflective portion 10a in code pattern 10A is a curved surface provided with curvature in each of the radial direction and the circumferential direction of rotating plate 2. Note that the surface of non-light-reflective portion 10b in code pattern 10A is also a curved surface provided with curvature in each of the radial direction and the circumferential direction of rotating plate 2.

More specifically, in encoder 1A in the present embodiment, the surface of each of light-reflective portion 10a and non-light-reflective portion 10b in first absolute pattern 11a, second absolute pattern 11b, and incremental pattern 12 is a curved surface provided with curvature in both the radial direction and the circumferential direction of rotating plate 2.

Note that encoder 1A according to the present embodiment has the same configuration as that of encoder 1 according to Embodiment 1 above except for the shapes of the surfaces of light-reflective portion 10a and non-light-reflective portion 10b in code pattern 10A.

Next, the effects of encoder 1A according to the present embodiment will be described below. In encoder 1A according to the present embodiment as well, the optical simulation of the light reflection action of light-reflective portion 10a in code pattern 10A was performed, and a description will thus be provided along with the simulation results.

Figure 15:
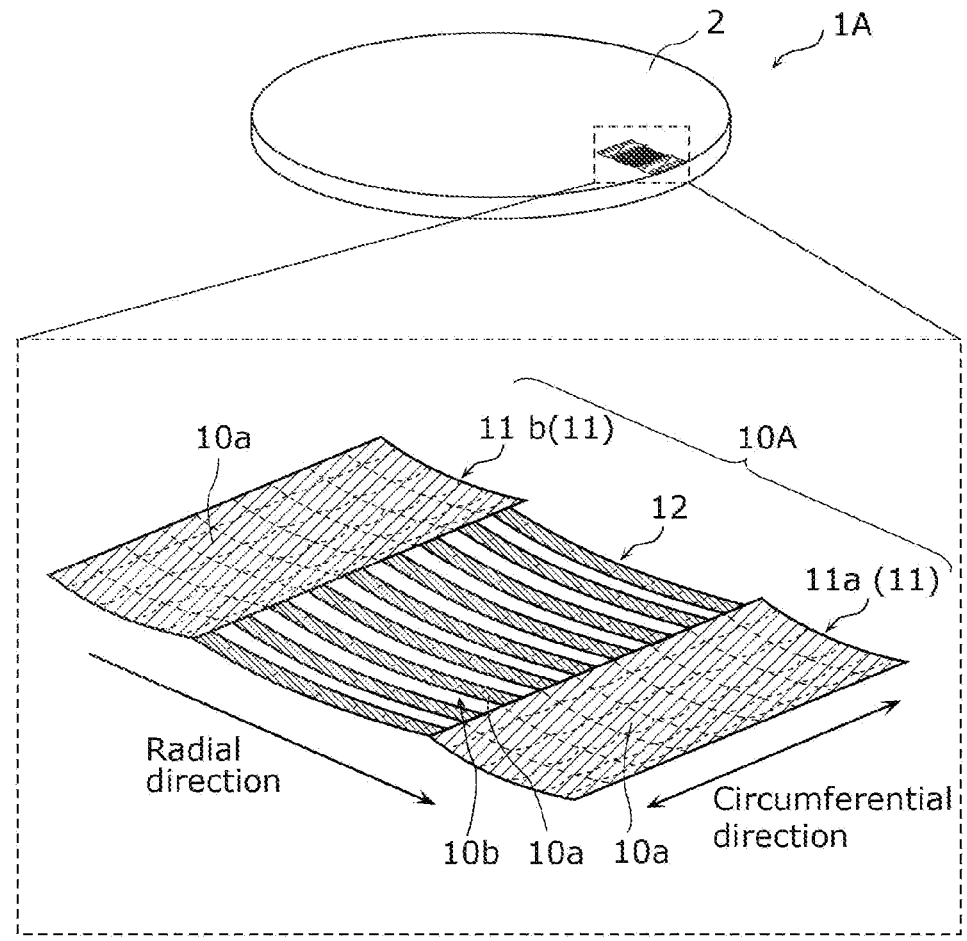
FIG. 15 is a view schematically illustrating the configuration of the encoder according to Embodiment 2 used in optical simulation.

FIG. 15 is a view schematically illustrating a configuration of encoder 1A according to Embodiment 2 used in this simulation. As illustrated in FIG. 15, in encoder 1A according to the present embodiment, the surface of light-reflective portion 10a constituting code pattern 10A is a concave curved surface having curvature in each of the radial direction and the circumferential direction of rotating plate 2. In code pattern 10A illustrated in FIG. 15, absolute pattern 11 is a pattern in which only a plurality of light-reflective portions 10a are arranged, and incremental pattern 12 is a pattern in which light-reflective portions 10a and non-light-reflective portions 10b are arranged alternately.

Figure 16:
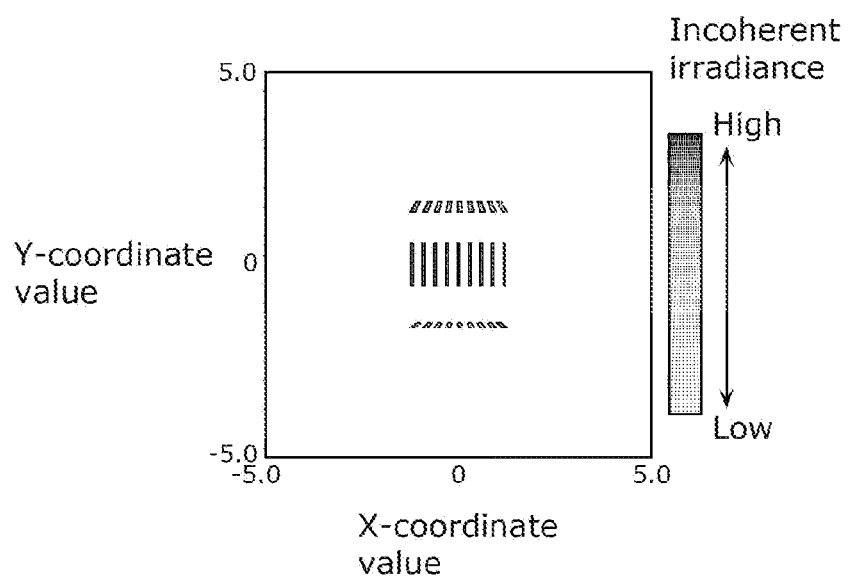
FIG. 16 is a view illustrating an irradiation pattern and a light intensity distribution of reflected light in the code pattern of the encoder according to Embodiment 2.

In this case, when code pattern 10A illustrated in FIG. 15 is irradiated with light from irradiator 4 formed of a single point light source disposed to face incremental pattern 12, an irradiation pattern and a light intensity distribution as illustrated in FIG. 16 are obtained. Note that this simulation also assumed a light receiver capable of simultaneously receiving light reflected by every light-reflective portion 10a of code pattern 10A illustrated in FIG. 16.

In encoder 1A according to the present embodiment, since the surface of light-reflective portion 10a in code pattern 10A is a concave curved surface having curvature in each of the radial direction and the circumferential direction of rotating plate 2, the light beams reflected by the surfaces of respective light-reflective portions 10a are condensed so as to be reduced in width in the radial direction of rotating plate 2 and are received by the respective light-receiving elements.

Thus, as illustrated in FIG. 16, the irradiation spot of the light reflected by each light-reflective portion 10a in absolute pattern 11 and the irradiation spot of the light reflected by each light-reflective portion 10a in incremental pattern 12 are separated in the radial direction of rotating plate 2, as in Embodiment 1 above. That is, the irradiation spots are separated for the respective lanes for first absolute pattern 11a, incremental pattern 12, and second absolute pattern 11b.

Moreover, in the present embodiment, the light reflected by the surface of each light-reflective portion 10a is condensed so as to be reduced in width not only in the radial direction of rotating plate 2 but also in the circumferential direction of rotating plate 2. This leads to a reduction in the size of the irradiation spot of the light reflected by the surface of each light-reflective portion 10a not only in the radial direction of rotating plate 2 but also in the circumferential direction of rotating plate 2. Thus, as illustrated in FIG. 16, the irradiation spot of the light reflected by each of the plurality of light-reflective portions 10a in absolute pattern 11 is separated from one another in the circumferential direction of rotating plate 2.

Note that the irradiation spot of the light reflected by each of the plurality of light-reflective portions 10a in incremental pattern 12 is smaller in size in the circumferential direction of rotating plate 2 compared to that in Embodiment 1 above.

In encoder 1A configured as described above, when the light beams reflected by the plurality of respective light-reflective portions 10a in code pattern 10A are received by light receiver 5, the light beams reflected by light-reflective portions 10a are received by the respective light-receiving elements in light receiver 5, as in Embodiment 1 above.

Figure 17:
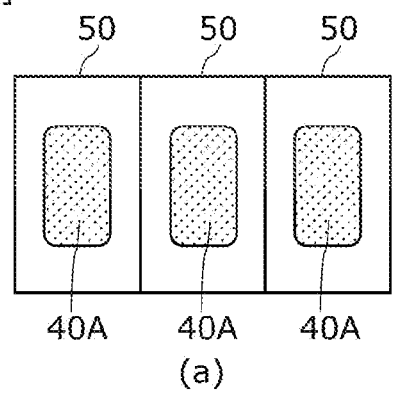
FIG. 17 is a view for explaining the optical action of the code pattern of the encoder according to Embodiment 2.
Figure 17:
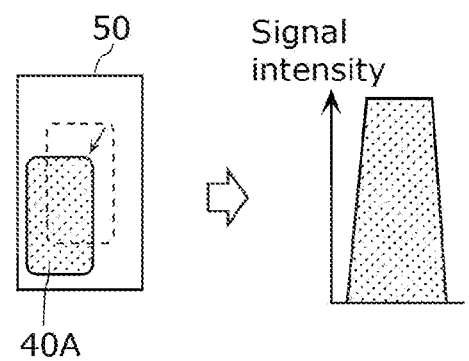

At this time, as illustrated in (a) in FIG. 17, in a normal state where neither eccentricity nor surface blurring has occurred, irradiation spot 40A of the light, reflected by light-reflective portion 10a, in light-receiving region 50 of each light-receiving element does not extend beyond the predetermined range of light-receiving region 50, and falls within the predetermined range of light-receiving region 50.

In encoder 1A according to the present embodiment, since the surface of light-reflective portion 10a is a concave curved surface having curvature in each of the radial direction and the circumferential direction of rotating plate 2, the length of irradiation spot 40A in light-receiving region 50 is shorter not only in the radial direction of rotating plate 2 but also in the circumferential direction of rotating plate 2, compared to that in encoder 1X of the comparative example. That is, the spot diameter of irradiation spot 40A in each of the radial direction and the circumferential direction of rotating plate 2 can be made smaller to reduce the overall size of irradiation spot 40.

As a result, even when the position of irradiation spot 40A is displaced as illustrated in the left view of (b) in FIG. 17 due to the occurrence of eccentricity or surface blurring, it is possible to inhibit irradiation spot 40A from extending beyond the predetermined range of light-receiving region 50. Even if irradiation spot 40A extends beyond the predetermined range of light-receiving region 50, the amount of extension can be made even smaller than that in Embodiment 1 above.

As a result, as illustrated in the right figure of (b) in FIG. 17, the signal intensity of the light received by the light-receiving element does not decrease. Even if the signal intensity decreases, it is possible to inhibit the signal intensity from decreasing more than in Embodiment 1 above. This can further inhibit the occurrence of erroneous detection.

Therefore, encoder 1A according to the present embodiment can perform position detection with higher accuracy than that in Embodiment 1 above.

In encoder 1A according to the present embodiment, since irradiation spot 40A can be made smaller than that in Embodiment 1 above, the light-receiving element can be further reduced in size. It is thereby possible to achieve a further cost reduction and realize a faster response.

Embodiment 3

Figure 18A:
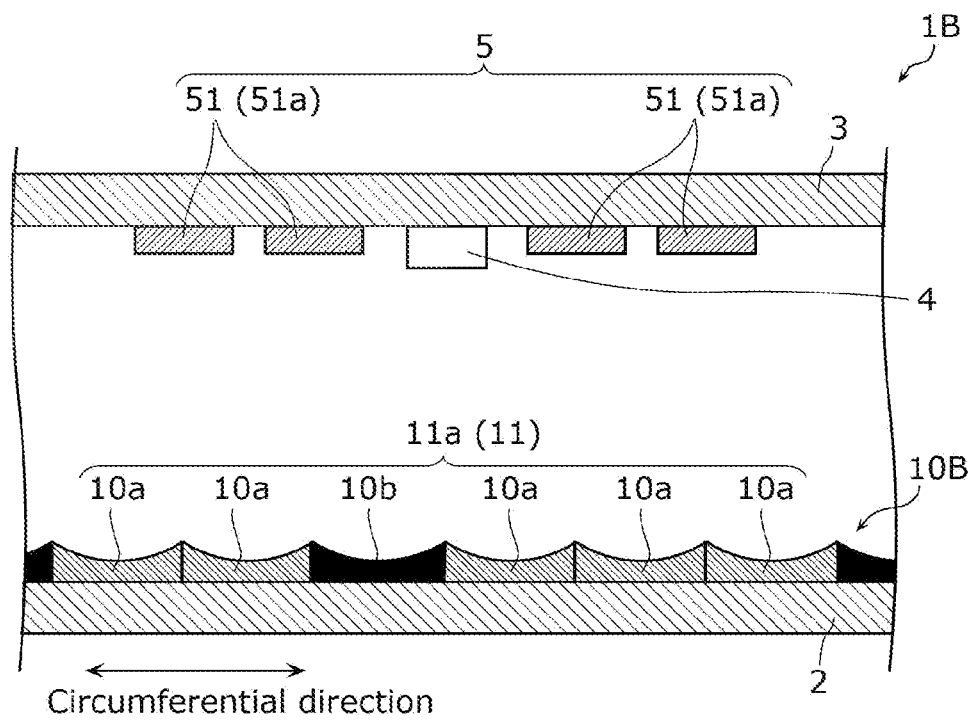
FIG. 18A is a cross-sectional view of an encoder according to Embodiment 3 in a circumferential cross-section of a rotating plate, taken along a first absolute pattern
Figure 18B:
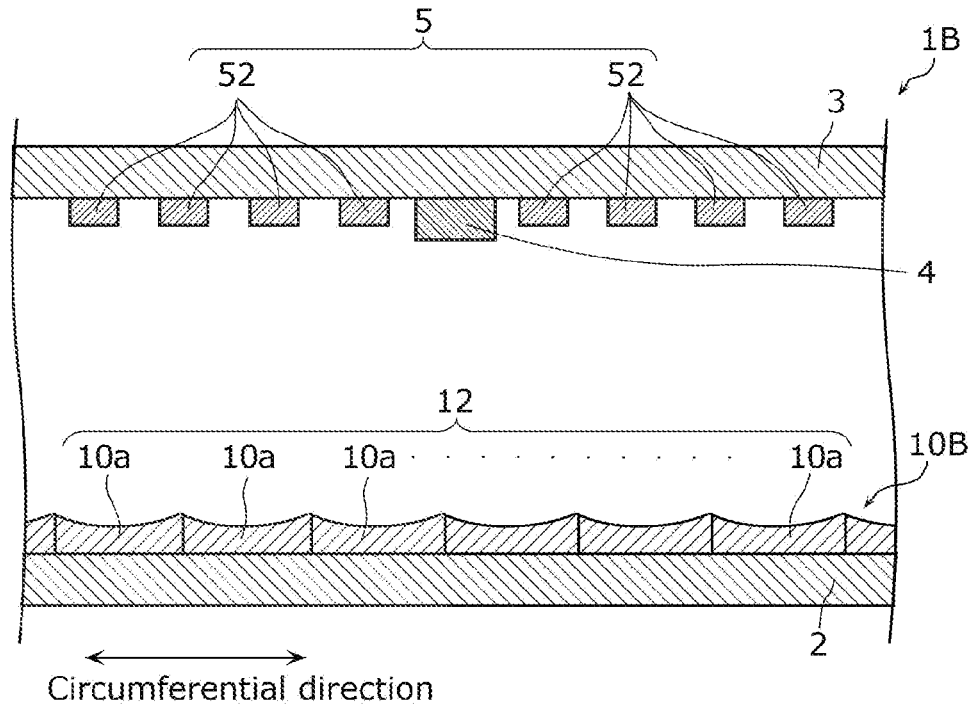
FIG. 18B is a cross-sectional view of the encoder according to Embodiment 3 in a circumferential cross-section of the rotating plate, taken along an incremental pattern.
Figure 19:
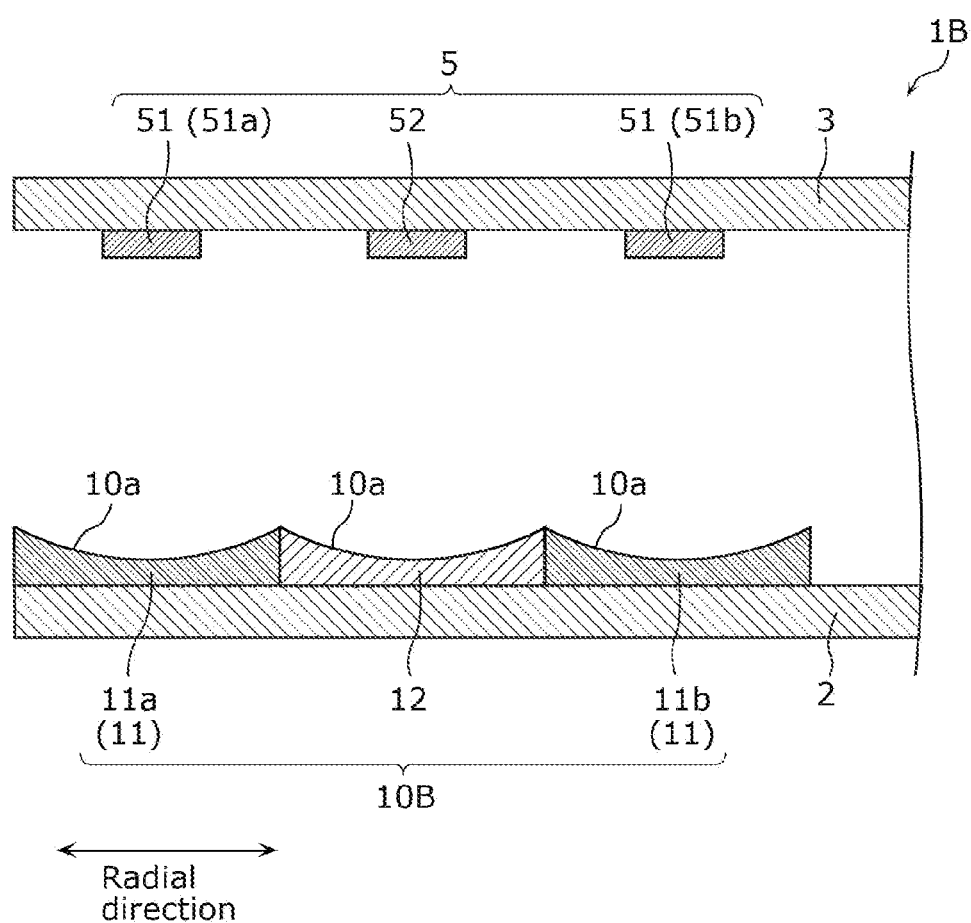
FIG. 19 is an enlarged cross-sectional view of the encoder according to Embodiment 3 in a radial cross-section of the rotating plate.

Next, encoder 1B according to Embodiment 3 will be described with reference to FIGS. 18A, 18B, and 19. FIGS. 18A and 18B are cross-sectional views of encoder 1B according to Embodiment 3 in the circumferential cross-section of rotating plate 2. FIG. 18A is a cross-section taken along first absolute pattern 11a, and FIG. 18B is a cross-section taken along incremental pattern 12. FIG. 19 is an enlarged cross-sectional view of same encoder 1B in the radial cross-section of rotating plate 2. FIG. 18A, FIG. 18B and FIG. 19 correspond to FIG. 3A, FIG. 3B, and FIG. 4 in Embodiment 1 above. Encoder 1B according to the present embodiment differs from encoder 1A according to Embodiment 2 above in the layout of incremental pattern 12 in code pattern 10B. Specifically, in encoder 1A according to Embodiment 2 above, incremental pattern 12 in code pattern 10A has included light-reflective portion 10a and non-light-reflective portion 10b, but in encoder 1B according to the present embodiment, as illustrated in FIGS. 18A, 18B, and 19, incremental pattern 12 in code pattern 10B does not include non-light-reflective portion 10b and only includes light-reflective portion 10a. That is, in the present embodiment, one pitch of incremental pattern 12 is practically twice as wide as that in Embodiments 1 and 2.

Therefore, in encoder 1B according to the present embodiment, the width per pitch of absolute pattern 11 is the same as the width per pitch of incremental pattern 12 in code pattern 10B. In other words, absolute pattern 11 and incremental pattern 12 have the same pitch. First absolute pattern 11a and second absolute pattern 11b also have the same pitch.

In the present embodiment, the surface of light-reflective portion 10a in code pattern 10B is a curved surface provided with curvature in each of the radial direction and the circumferential direction of rotating plate 2, as in Embodiment 2 above.

Note that encoder 1B according to the present embodiment has the same configuration as encoder 1A according to Embodiment 2 above except for the layout of incremental pattern 12 in code pattern 10B.

Next, the effects of encoder 1B according to the present embodiment will be described below. In encoder 1B according to the present embodiment as well, the optical simulation of the light reflection action of light-reflective portion 10a in code pattern 10B was performed, and a description will thus be provided along with the simulation results.

Figure 20:
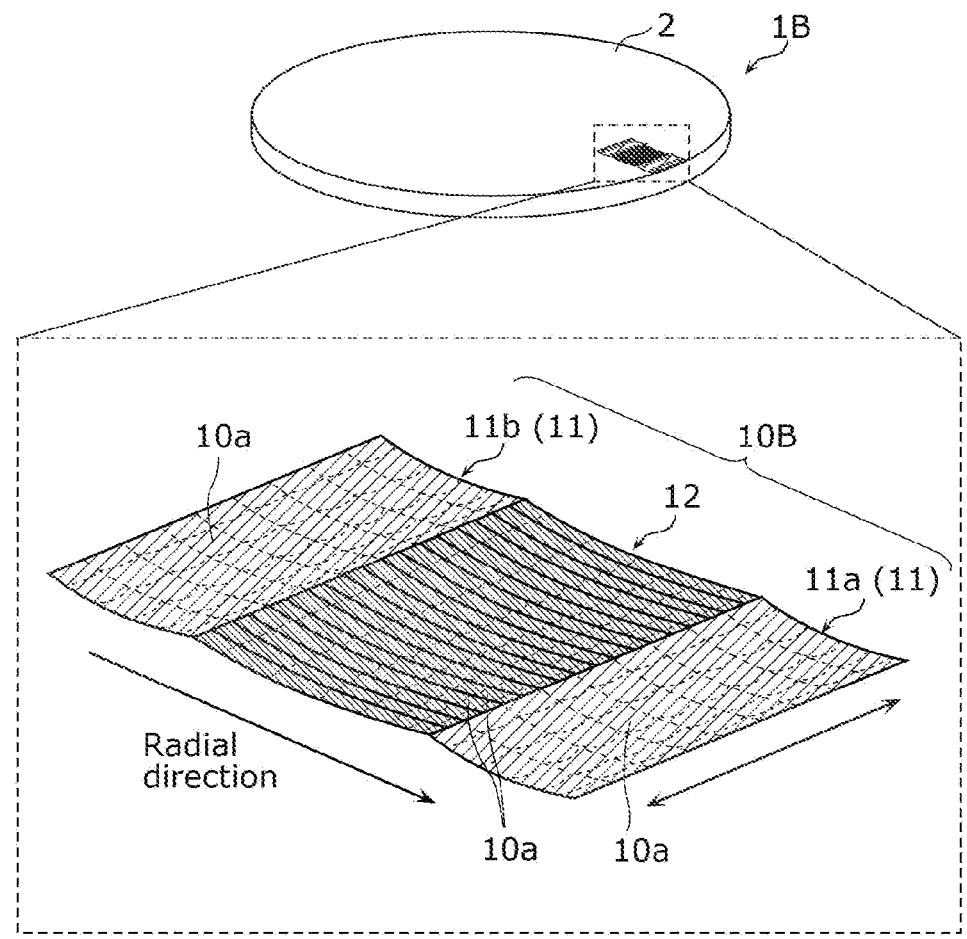
FIG. 20 is a view schematically illustrating the configuration of the encoder according to Embodiment 3 used in optical simulation.

FIG. 20 is a view schematically illustrating a configuration of encoder 1B according to Embodiment 3 used in this simulation. As illustrated in FIG. 20, in encoder 1B according to the present embodiment, both absolute pattern 11 and incremental pattern 12 only include light-reflective portions 10a, and absolute pattern 11 and incremental pattern 12 have the same pitch. Note that the surface of every light-reflective portion 10a constituting code pattern 10B is a concave curved surface having curvature in each of the radial direction and the circumferential direction of rotating plate 2.

Figure 21:
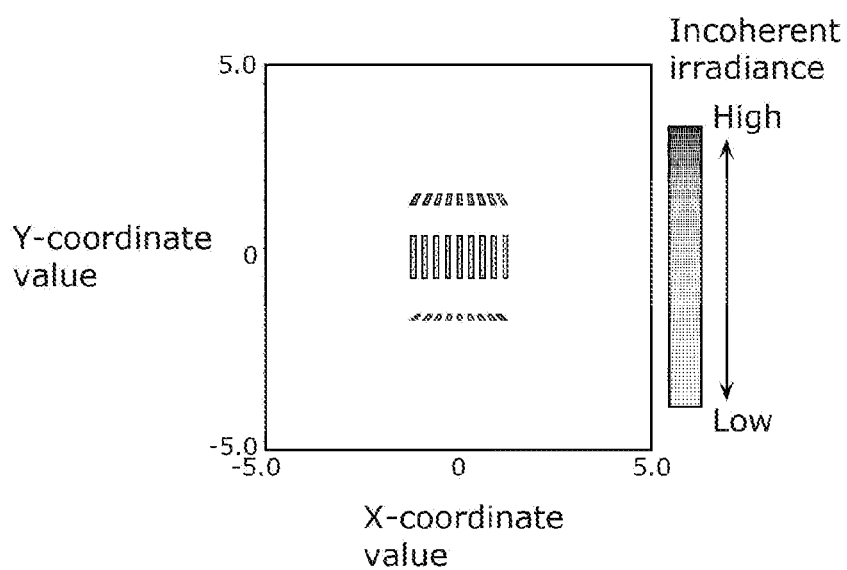
FIG. 21 is a view illustrating an irradiation pattern and a light intensity distribution of reflected light in the code pattern of the encoder according to Embodiment 3.

In this case, when code pattern 10B illustrated in FIG. 20 is irradiated with light from irradiator 4 formed of a single point light source disposed to face incremental pattern 12, an irradiation pattern and a light intensity distribution as illustrated in FIG. 21 are obtained. Note that this simulation also assumed a light receiver capable of simultaneously receiving light reflected by every light-reflective portion 10a of code pattern 10B illustrated in FIG. 20.

In encoder 1B according to the present embodiment, as in Embodiment 2 above, since the surface of light-reflective portion 10a in code pattern 10B is a concave curved surface having curvature in each of the radial direction and the circumferential direction of rotating plate 2, the light beams reflected by the surfaces of respective light-reflective portions 10a are condensed so as to be reduced in width in the radial direction of rotating plate 2 and are received by the respective light-receiving elements.

Thus, as illustrated in FIG. 21, the irradiation spot of the light reflected by each light-reflective portion 10a in absolute pattern 11 and the irradiation spot of the light reflected by each light-reflective portion 10a in incremental pattern 12 are separated in the radial direction of rotating plate 2, and the light reflected by the surface of each light-reflective portion 10a is condensed so as to be reduced in width in both the radial direction and the circumferential direction of rotating plate 2.

Therefore, the irradiation spot of the light reflected by the surface of each light-reflective portion 10a in absolute pattern 11 becomes smaller in the radial direction and the circumferential direction of rotating plate 2, and is separated from one another in the circumferential direction of rotating plate 2.

Moreover, in the present embodiment, unlike Embodiment 2 above, absolute pattern 11 and incremental pattern 12 have the same pitch, and the width of one pitch of incremental pattern 12 is twice that in Embodiment 2 above. Hence the analog amount of the light reflected by light-reflective portion 10a in incremental pattern 12 is twice that in Embodiment 2 above.

Therefore, the irradiation spot of the light reflected by the surface of each light-reflective portion 10a in incremental pattern 12 is separated from one another in the circumferential direction of rotating plate 2, but the width of the irradiation spot is larger in the circumferential direction of rotating plate 2 than that in Embodiment 2 above. In the present embodiment, the width of the irradiation spot of the light reflected by the surface of each light-reflective portion 10a in incremental pattern 12 is equal to the width of the irradiation spot of the light reflected by the surface of each light-reflective portion 10a in incremental pattern 12 of Embodiment 1 above.

As described above, according to code pattern 10B of encoder 1B in the present embodiment, the light reflected by each light-reflective portion 10a in absolute pattern 11 and incremental pattern 12 can obtain an intensity distribution in which brightness and darkness appear at equal intervals, as illustrated in FIG. 21.

In encoder 1B configured as described above, when the light beams reflected by the plurality of respective light-reflective portions 10a in code pattern 10B are received by light receiver 5, the light beams reflected by light-reflective portions 10a are received by the respective light-receiving elements in light receiver 5, as in Embodiments 1 and 2.

At this time, although not illustrated, the irradiation spot of the light reflected by each of the plurality of light-reflective portions 10a in code pattern 10B can be made smaller in the present embodiment as well. Therefore, even when the position of the irradiation spot is displaced due to the occurrence of eccentricity or surface blurring, the irradiation spot can be inhibited from extending beyond the predetermined range of the light-receiving region. Thus, a decrease in the signal intensity of the light received by the light-receiving element can be inhibited, whereby the occurrence of erroneous detection can be inhibited. Therefore, position detection with high accuracy can be performed in encoder 1B according to the present embodiment as well.

Further, the smaller irradiation spot enables a reduction in the size of the light-receiving element in encoder 1B according to the present embodiment as well. It is thereby possible to achieve a cost reduction and realize a fast response.

Note that the present embodiment may be applied to Embodiment 1 above. That is, in the present embodiment, as in Embodiment 2 above, the surface of light-reflective portion 10a has been the curved surface provided with curvature in each of the radial direction and the circumferential direction of rotating plate 2, but as in Embodiment 1 above, the surface of light-reflective portion 10a may be a curved surface provided with curvature only in the radial direction of rotating plate 2.

In the present embodiment, absolute pattern 11 and incremental pattern 12 have been set to have the same pitch, but the present invention is not limited thereto. For example, the width per pitch of absolute pattern 11 and the width per pitch of incremental pattern 12 may be different from one another.

Embodiment 4

Figure 22:
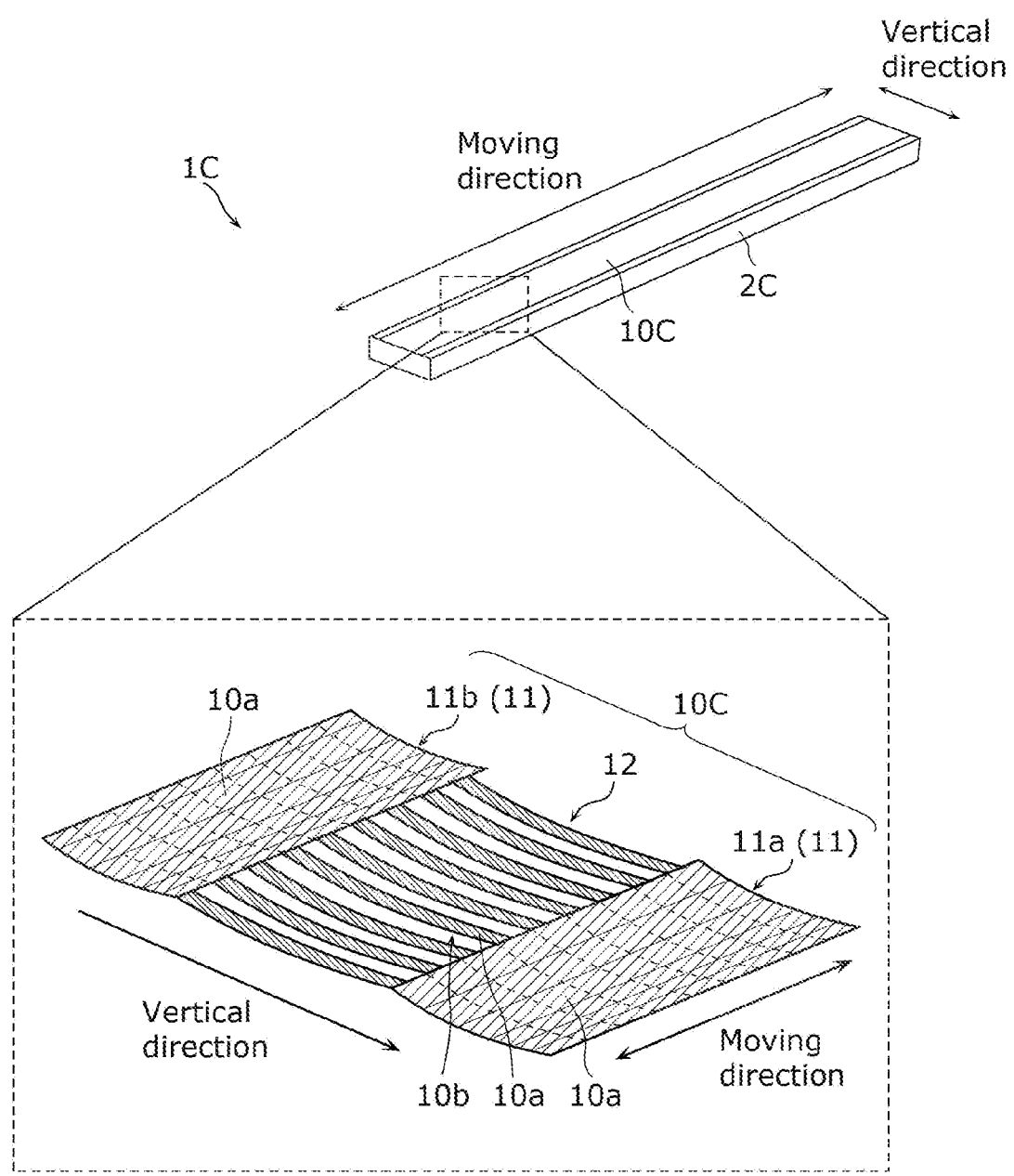
FIG. 22 is a view schematically illustrating a configuration of an encoder according to Embodiment 4.

Next, encoder 1C according to Embodiment 4 will be described with reference to FIG. 22. FIG. 22 is a view schematically illustrating a configuration of encoder 1C according to Embodiment 4.

While the encoders 1, 1A, 1B in Embodiments 1 to 3 have been rotary encoders, encoder 1C in the present embodiment is a linear encoder. That is, the technology of the present disclosure can be applied to a linear encoder as well as a rotary encoder.

Therefore, in encoder 1C according to the present embodiment, as illustrated in FIG. 22, linearly moving substrate 2C is used instead of rotating plate 2. Substrate 2C is, for example, a long rectangular substrate. The longitudinal direction of substrate 2C is the moving direction of substrate 2C.

In encoder 1C in the present embodiment, code pattern 10C is provided on this substrate 2C. In the present embodiment, code pattern 10C is a pattern for detecting linear displacement.

As in Embodiment 1 above, code pattern 10C in the present embodiment is formed of light-reflective portion 10a and non-light-reflective portion 10b, but unlike Embodiment 1 above, light-reflective portion 10a and non-light-reflective portion 10b are arranged along the longitudinal direction of substrate 2C.

Specifically, code pattern 10C includes absolute pattern 11 formed of a plurality of light-reflective portions 10a and a plurality of non-light-reflective portions 10b, and incremental pattern 12 formed of a plurality of light-reflective portions 10a and a plurality of non-light-reflective portions 10b.

In the present embodiment, absolute pattern 11 and incremental pattern 12 in code pattern 10C are provided at different positions in a direction (vertical direction) orthogonal to the moving direction of substrate 2C. Absolute pattern 11 in code pattern 10C includes first absolute pattern 11a and second absolute pattern 11b. First absolute pattern 11a and second absolute pattern 11b are provided at different positions in the direction (vertical direction) orthogonal to the moving direction of substrate 2C. Incremental pattern 12 is disposed between first absolute pattern 11a and second absolute pattern 11b.

As an example, first absolute pattern 11a and second absolute pattern 11b are M-code patterns. Light-reflective portions 10a and non-light-reflective portions 10b in each of first absolute pattern 11a and second absolute pattern 11b are repeatedly provided along the moving direction of substrate 2C in such an order as to constitute an M-code. Incremental pattern 12 is, for example, an array in which light-reflective portions 10a and non-light-reflective portions 10b are alternately repeated one by one along the moving direction of substrate 2C.

In code pattern 10C, the width per one pitch of absolute pattern 11 is smaller than the width per one pitch of incremental pattern 12. For example, the width per pitch of absolute pattern 11 is half the width per pitch of incremental pattern 12. Note that code pattern 10C is provided over the entire length of substrate 2C in the longitudinal direction, but the present invention is not limited thereto.

In the present embodiment as well, code pattern 10C includes a curved surface. Specifically, as the curved surface, each of light-reflective portion 10a and non-light-reflective portion 10b constituting code pattern 10C includes a concave curved surface. That is, a concave curved surface is formed on the surface of each of light-reflective portion 10a and non-light-reflective portion 10b constituting absolute pattern 11 and incremental pattern 12 in code pattern 10C.

In the present embodiment, the curved surface of each of light-reflective portion 10a and non-light-reflective portion 10b in code pattern 10C has a shape in which curvature is provided in a direction (vertical direction) orthogonal to the moving direction of substrate 2C. Specifically, in both absolute pattern 11 and incremental pattern 12, each surface of light-reflective portion 10a and non-light-reflective portion 10b is a curved surface provided with curvature only in the vertical direction, out of the moving direction and the vertical direction of substrate 2C, and no curvature is provided in the moving direction. As an example, the surface of each of light-reflective portion 10a and non-light-reflective portion 10b in code pattern 10C is a concave cylindrical surface having a cylindrical axis in the moving direction of substrate 2C.

Although not illustrated, encoder 1C includes fixed portion 3 in the present embodiment as well. Fixed portion 3 is provided with irradiator 4, light receiver 5, and processor 6.

Irradiator 4 simultaneously irradiates each of a plurality of curved surfaces of substrate 2C with light in the present embodiment as well. That is, irradiator 4 simultaneously irradiates each of the plurality of light-reflective portion 10a constituting code pattern 10C with light. In this case, each of a plurality of light-reflective portions 10a and non-light-reflective portions 10b in a part of absolute pattern 11 and a part of incremental pattern 12 is simultaneously irradiated with light. Irradiator 4 is a single point light source in the present embodiment as well.

Light receiver 5 receives the light emitted from irradiator 4 via substrate 2C. Light receiver 5 receives the light emitted from irradiator 4 and reflected by code pattern 10C in the present embodiment as well. That is, light receiver 5 receives the light reflected by the curved surface (reflective surface) of light-reflective portion 10a in code pattern 10C. Specifically, light receiver 5 simultaneously receives the light reflected by each of the plurality of light-reflective portions 10a in first absolute pattern 11a, second absolute pattern 11b, and incremental pattern 12.

In the present embodiment, light receiver 5 includes a first light-receiving element group in which a plurality of first light-receiving elements 51 each for receiving light emitted from irradiator 4 via absolute pattern 11 are arranged in the moving direction of substrate 2C, and a second light-receiving element group in which a plurality of second light-receiving elements 52 each for receiving light emitted from irradiator 4 via incremental pattern 12 are arranged in the moving direction of substrate 2C. The light via absolute pattern 11 and the light via incremental pattern 12 are simultaneously received by the first light-receiving element group and the second light-receiving element group, respectively.

In encoder 1C according to the present embodiment configured as described above, as in Embodiment 1 above, a plurality of curved surfaces are provided on the surface of substrate 2C, and irradiator 4 simultaneously irradiates each of the plurality of curved surfaces with light. Specifically, in encoder 1C according to the present embodiment, each of light-reflective portion 10a and non-light-reflective portion 10b provided on substrate 2C as code pattern 10C includes a concave curved surface.

With this configuration, encoder 1C according to the present embodiment exerts the same effects as in Embodiment 1 above. Specifically, the irradiation spot of the light reflected by each of the plurality of light-reflective portions 10a in code pattern 10C can be made smaller in the present embodiment as well. Therefore, even when the position of the irradiation spot is displaced, the irradiation spot can be inhibited from extending beyond the predetermined range of the light-receiving region. Thus, a decrease in the signal intensity of the light received by the light-receiving element can be inhibited, whereby the occurrence of erroneous detection can be inhibited. Therefore, position detection with high accuracy can be performed in encoder 1C according to the present embodiment as well.

Further, the smaller irradiation spot enables a reduction in the size of the light-receiving element in encoder 1C according to the present embodiment as well. It is thereby possible to achieve a cost reduction and realize a fast response.

Although the configuration of code pattern 10 in Embodiment 1 above has been applied to code pattern 10C in the present embodiment, the present invention is not limited thereto. For example, code pattern 10A in Embodiment 2 or code pattern 10B in Embodiment 3 may be applied to code pattern 10C in the present embodiment. That is, the curved surface of each of light-reflective portion 10a and non-light-reflective portion 10b in code pattern 10C may be a curved surface provided with curvature in the moving direction of substrate 2C.

Variations

The encoder according to the present disclosure has been described above based on the embodiments, but the present disclosure is not limited to the above embodiments.

Figure 23:
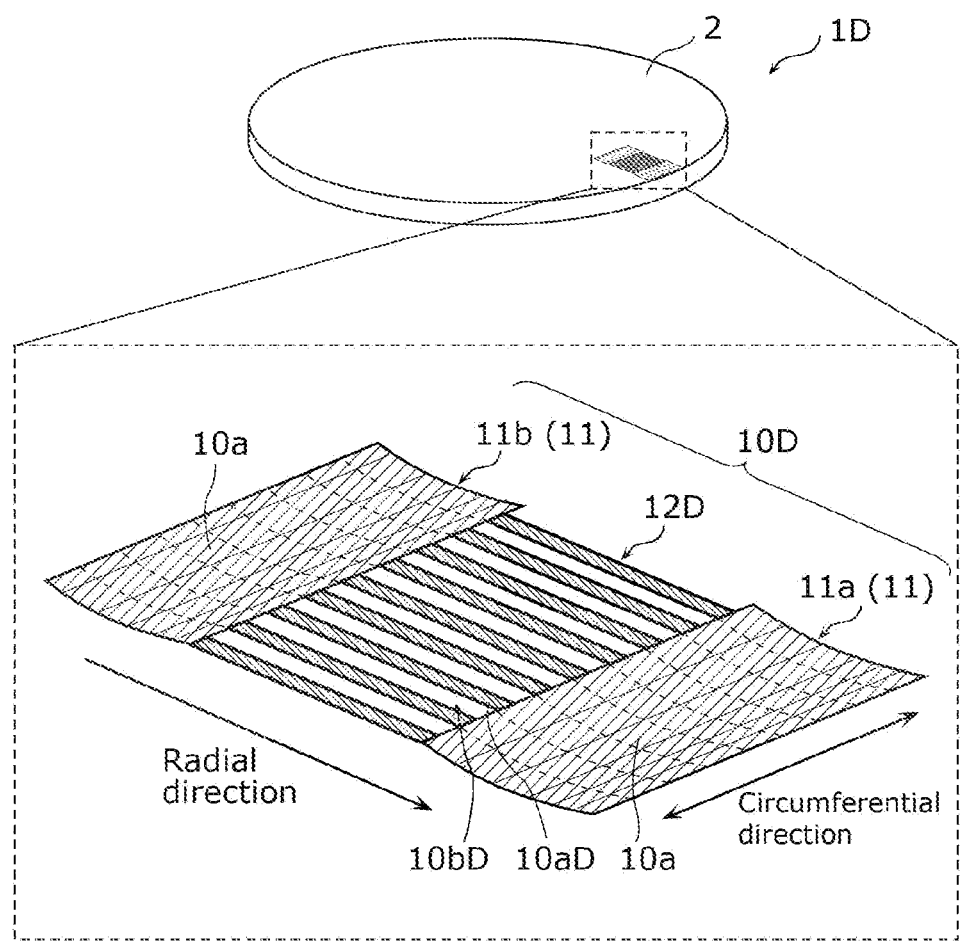
FIG. 23 is a view schematically illustrating a configuration of an encoder according to a variation.
Figure 24:
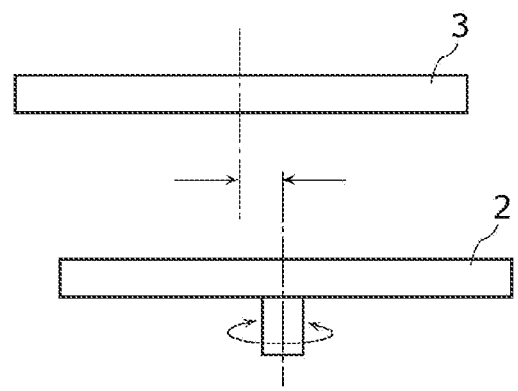
FIG. 24 is a view illustrating how eccentricity occurs in a rotary encoder.
Figure 25:
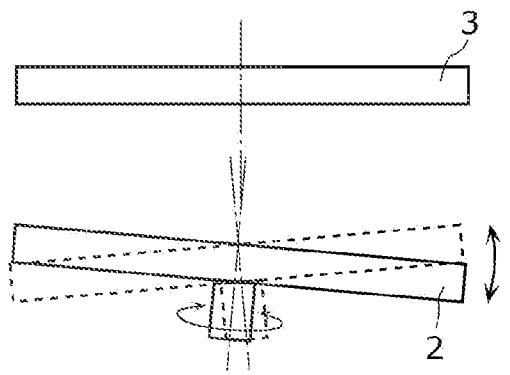
FIG. 25 is a view illustrating how surface blurring occurs in the rotary encoder.

For example, in Embodiments 1 to 3 above, each of absolute pattern 11 and incremental pattern 12 provided on rotating plate 2 as code pattern 10 has included a plurality of curved surfaces, and rotating plate 2 has been provided with a plurality of curved surfaces, but the present invention is not limited thereto. Specifically, rotating plate 2 only needs to be provided with at least one curved surface. For example, as in encoder 1D illustrated in FIG. 23, out of absolute pattern 11 and incremental pattern 12D provided on rotating plate 2 as code pattern 10D, each of light-reflective portion 10a and non-light-reflective portion 10b in absolute pattern 11 may be formed of a concave curved surface, and each of light-reflective portion 10aD and non-light-reflective portion 10bD of incremental pattern 12D may be formed of a flat surface. In this case, irradiator 4 simultaneously irradiates each of a plurality of surfaces including at least one curved surface with light. The fact that rotating plate 2 only needs to be provided with at least one curved surface may be applied to Embodiment 4.

In Embodiment 1 above, the surface of each of light-reflective portion 10a and non-light-reflective portion 10b in code pattern 10 has been the curved surface provided with curvature only in the radial direction, out of the radial direction and the circumferential direction of rotating plate 2, but the present invention is not limited thereto. Specifically, the surface of each of light-reflective portion 10a and non-light-reflective portion 10b in code pattern 10 may be a curved surface provided with curvature only in the circumferential direction, out of the radial direction and the circumferential direction of rotating plate 2.

Similarly, in Embodiment 4, the surface of each of light-reflective portion 10a and non-light-reflective portion 10b in code pattern 10C has been the curved surface provided with curvature only in the vertical direction, out of the moving direction and the vertical direction of substrate 2C, but the present invention is not limited thereto. Specifically, the surface of each of light-reflective portion 10a and non-light-reflective portion 10b in code pattern 10C may be a curved surface provided with curvature only in the moving direction, out of the moving direction and the vertical direction of substrate 2C.

In Embodiment 1 above, the surfaces of both light-reflective portion 10a and non-light-reflective portion 10b in code pattern 10 have been the curved surfaces, but the present invention is not limited thereto. Specifically, the surface of only light-reflective portion 10a, out of light-reflective portion 10a and non-light-reflective portion 10b in code pattern 10, may be a curved surface. Note that this also applies to Embodiments 2 and 4 above.

In Embodiment 1 above, absolute pattern 11 and incremental pattern 12 in code pattern 10 have been provided over the entire circumference of rotating plate 2, but the present invention is not limited thereto. Specifically, absolute pattern 11 and incremental pattern 12 in code pattern 10 may be provided in a part of rotating plate 2 along the circumferential direction of rotating plate 2 at a predetermined circumferential angle. Note that this also applies to Embodiments 2 and 3 above.

In Embodiment 1 above, rotating plate 2 of encoder 1 has included both absolute pattern 11 and incremental pattern 12 as code pattern 10, but the present invention is not limited thereto. Specifically, rotating plate 2 of encoder 1 only needs to have at least one of absolute pattern 11 or incremental pattern 12 as code pattern 10. Although absolute pattern 11 has included first absolute pattern 11a and second absolute pattern 11b in Embodiment 1 above, absolute pattern 11 may include only one of first absolute pattern 11a or second absolute pattern 11b, or may further include a third absolute pattern. Incremental pattern 12 may also include a plurality of incremental patterns. That is, the number of lanes (tracks) for absolute pattern 11 and incremental pattern 12 constituting code pattern 10 is not limited to three, and may be one, two, or four or more. Note that this also applies to Embodiments 2 to 4 above.

In Embodiment 1 above, first absolute pattern 11a, incremental pattern 12, and second absolute pattern 11b have been provided in stated order from the outside to the inside in the radial direction, but the order of first absolute pattern 11a, incremental pattern 12, and second absolute pattern 11b is not limited thereto. For example, the patterns may be provided in the order of incremental pattern 12, first absolute pattern 11a, and second absolute pattern 11b from the outside to the inside in the radial direction, in the order of incremental pattern 12, first absolute pattern 11a, and second absolute pattern 11b from the inside to the outside in the radial direction, or in any other order. Note that this also applies to Embodiments 2 and 3 above. In Embodiment 4 as well, the order of first absolute pattern 11a, incremental pattern 12, and second absolute pattern 11b is not limited to the order described in Embodiment 4 above.

In addition, the present disclosure includes forms obtained by applying various modifications to the embodiments described above, which a person skilled in the art would conceive, and forms realized by arbitrarily combining the components and functions in the embodiments within the scope not departing from the gist of the present disclosure.

INDUSTRIAL APPLICABILITY

The encoder according to the present disclosure is useful for equipment or a device, such as a motor, that rotates or moves linearly.

REFERENCE SIGNS LIST 1, 1A, 1B, 1C, 1D encoder
2 rotating plate
2C substrate
3 fixed portion
4 irradiator
5 light receiver
6 processor
7 rotation shaft
10, 10A, 10B, 10C, 10D code pattern
10a, 10aD light-reflective portion
10b, 10bD non-light-reflective portion
11 absolute pattern
11a first absolute pattern
11b second absolute pattern
12, 12D incremental pattern
40, 40A irradiation spot
50 light-receiving region
51, 51a, 51b first light-receiving element
52 second light-receiving element

The invention claimed is:

1. An encoder comprising:
a rotating plate;
an irradiator that irradiates the rotating plate with light; and
a light receiver that receives the light which has been emitted from the irradiator and traveled via the rotating plate,
wherein the rotating plate includes at least one curved surface,
the irradiator simultaneously irradiates each of a plurality of surfaces including the at least one curved surface with light,
the at least one curved surface comprises a plurality of curved surfaces,
the rotating plate includes a light-reflective portion and a non-light-reflective portion, and
the light-reflective portion and the non-light reflective portion each include a curved surface with a concave shape, collectively serving as the plurality of curved surfaces.

2. The encoder according to claim 1,
wherein the plurality of curved surfaces each have a shape provided with curvature in a radial direction of the rotating plate.

3. The encoder according to claim 1,
wherein the plurality of curved surfaces each have a shape provided with curvature in a circumferential direction of the rotating plate.

4. The encoder according to claim 1,
wherein the plurality of curved surfaces each have a shape provided with curvature in a radial direction and a circumferential direction of the rotating plate.

5. The encoder according to claim 1,
wherein the rotating plate has a pattern for detecting rotational displacement, and
the pattern has the plurality of curved surfaces.

6. The encoder according to claim 5,
wherein the pattern is at least one of an absolute pattern or an incremental pattern.

7. The encoder according to claim 6,
wherein the pattern is both the absolute pattern and the incremental pattern.

8. The encoder according to claim 7,
wherein a width per pitch of the absolute pattern is smaller than a width per pitch of the incremental pattern.

9. The encoder according to claim 7,
wherein a width per pitch of the absolute pattern is half a width per pitch of the incremental pattern.

10. The encoder according to claim 7,
wherein a width per pitch of the absolute pattern is equal to a width per pitch of the incremental pattern.

11. The encoder according to claim 7,
wherein the light receiver includes:
a first light-receiving element group, where a plurality of light-receiving elements are arranged in a circumferential direction to each receive the light that has traveled via the absolute pattern; and
a second light-receiving element group, where a plurality of light-receiving elements are arranged in the circumferential direction to each receive the light that has traveled via the incremental pattern.

12. The encoder according to claim 11,
wherein the light that has traveled via the absolute pattern and the light that has traveled via the incremental pattern are simultaneously received by the first light-receiving element group and the second light-receiving element group, respectively.

13. An encoder comprising:
a substrate that moves linearly;
an irradiator that irradiates the substrate with light; and
a light receiver that receives the light which has been emitted from the irradiator and traveled via the substrate,
wherein the substrate includes at least one curved surface,
the irradiator simultaneously irradiates each of a plurality of surfaces including the at least one curved surface with light,
the at least one curved surface comprises a plurality of curved surfaces,
the substrate includes a light-reflective portion and a non-light-reflective portion, and
the light-reflective portion and the non-light reflective portion each include a curved surface with a concave shape, collectively serving as the plurality of curved surfaces.

14. The encoder according to claim 13,
wherein the plurality of curved surfaces each have a shape provided with curvature in a moving direction of the substrate.

15. The encoder according to claim 13,
wherein the plurality of curved surfaces each have a shape provided with curvature in a direction orthogonal to the moving direction of the substrate.

16. The encoder according to claim 13,
wherein the plurality of curved surfaces each have a shape provided with curvature in a moving direction of the substrate and a direction orthogonal to the moving direction.

17. The encoder according to claim 13,
wherein the substrate has a pattern for detecting linear displacement, and
the pattern has the plurality of curved surfaces.

18. The encoder according to claim 17,
wherein the pattern is at least one of an absolute pattern or an incremental pattern.

19. The encoder according to claim 17,
wherein the pattern is both the absolute pattern and the incremental pattern.

20. The encoder according to claim 19,
wherein a width per pitch of the absolute pattern is smaller than a width per pitch of the incremental pattern.

21. The encoder according to claim 19,
wherein a width per pitch of the absolute pattern is half a width per pitch of the incremental pattern.

22. The encoder according to claim 19,
wherein a width per pitch of the absolute pattern is equal to a width per pitch of the incremental pattern.

23. The encoder according to claim 18,
wherein the light receiver includes:
a first light-receiving element group, where a plurality of light-receiving elements are arranged in a moving direction of the substrate to each receive the light that has traveled via the absolute pattern; and
a second light-receiving element group, where a plurality of light-receiving elements are arranged in the moving direction of the substrate to each receive the light that has traveled via the incremental pattern.

24. The encoder according to claim 23,
wherein the light that has traveled via the absolute pattern and the light that has traveled via the incremental pattern are simultaneously received by the first light-receiving element group and the second light-receiving element group, respectively.

* * * * *